(12) United States Patent
Michisaka et al.

(10) Patent No.: US 7,159,678 B2
(45) Date of Patent: Jan. 9, 2007

(54) AIR CLEANER APPARATUS FOR SCOOTER-TYPE VEHICLE

(75) Inventors: Susumu Michisaka, Wako (JP); Masao Ogawa, Wako (JP); Tomokatsu Suda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 10/836,461

(22) Filed: Apr. 30, 2004

(65) Prior Publication Data

US 2004/0231899 A1    Nov. 25, 2004

(30) Foreign Application Priority Data

May 9, 2003    (JP)   ............................ 2003-132407

(51) Int. Cl.
     *B60K 13/02*      (2006.01)

(52) U.S. Cl. .................... 180/68.3; 180/68.1; 180/68.2

(58) Field of Classification Search ............... 180/68.1, 180/180, 181, 55, 63, 60, 220, 229, 68.4, 180/68.2, 68.3; 280/169, 163, 164.1; 165/41; 95/268; 60/782, 784, 900; 123/41.04, 41.11, 123/41.56, 41.62, 198 E
See application file for complete search history.

(56) References Cited

U.S. PATENT DOCUMENTS 4,244,496 A * 1/1981 Litz ........................... 224/413
4,387,565 A * 6/1983 Otani et al. ................... 60/293
4,437,305 A * 3/1984 Ikenoya et al. ............... 60/293
4,733,639 A * 3/1988 Kohyama et al. ........ 123/198 E
5,101,924 A * 4/1992 Yamagiwa et al. .......... 180/220
D373,991 S * 9/1996 Timms ....................... D12/424
6,218,804 B1 * 4/2001 Toriyama et al. ............ 320/104
6,341,660 B1 * 1/2002 Schiller ....................... 180/220
6,357,542 B1 * 3/2002 Sako .......................... 180/68.5

FOREIGN PATENT DOCUMENTS

| CN | 1101400 | 4/1995 |
|---|---|---|
| DE | 3232583 | 3/1984 |
| JP | 62-223448 | 10/1987 |

* cited by examiner

*Primary Examiner*—Christopher P. Ellis
*Assistant Examiner*—Vaughn Coolman
(74) *Attorney, Agent, or Firm*—Hamre, Schumann, Mueller & Larson, PC

(57) ABSTRACT

An air cleaner device is provided for a scooter-type vehicle which can prevent foreign substances from entering an air intake port of an air cleaner even when the air cleaner is arranged at a position out of protection of the vehicle body cover. An air intake port cover covers the air intake port of the air cleaner and also covers a cooling air suction port of the power unit. The leakage of suction sound from the cooling air suction port can be prevented simultaneously.

3 Claims, 24 Drawing Sheets

AIR CLEANER APPARATUS FOR SCOOTER-TYPE VEHICLE

FIELD OF THE INVENTION

The present invention relates to an improved motorcycle.

BACKGROUND OF THE INVENTION

In the related art, various types of air cleaner apparatus for a scooter-type vehicle are put to practical use. Referring to FIG. 24, JP-A-62-223448 discloses an air cleaner configured in such a manner that an air intake port 44 is extended upward from a side surface 31 of the air cleaner, the top, the front and the rear thereof are covered with a roof-shaped cover 31a, and the entire air cleaner is covered with a vehicle body cover on the side surface, though it is not shown in this drawing, so that foreign substances are prevented from entering through the air intake port 44 of the air cleaner and suction sound is prevented from leaking outside the cover.

However, when such an air cleaner configuration is employed in a motorcycle having a largely cut-out side cover, there arise problems in that foreign substances are liable to enter, and also in that suction sound increases since the side surface of the air cleaner is not covered.

Accordingly, it is an object of the present invention to provide an air cleaner apparatus for a scooter-type vehicle in which entering of foreign substances and leakage of suction sound can be solved simultaneously even when the air intake port of the air cleaner is disposed at a position out of the protection of a vehicle body cover.

SUMMARY OF THE INVENTION

In order to achieve the aforementioned object, a scooter-type vehicle is provided including a power unit of such type of taking cooling air through a cooling-air suction port for controlling increase in internal temperature, the power unit being mounted to a vehicle body frame so as to be capable of swinging in the vertical direction, and an air cleaner disposed above the power unit, characterized in that an air intake port of the air cleaner is disposed in the vicinity of the cooling-air suction port of the power unit, and the air intake port of the air cleaner is also covered with an air intake port cover mounted to the cooling-air suction port.

The air intake port cover provided to cover the cooling-air suction port of the power unit is configured to cover the air intake port of the air cleaner as well. Consequently, even when the air intake port of the air cleaner is disposed at the position out of the protection of the vehicle body cover, entering of foreign substances and leakage of suction sound can be prevented simultaneously.

In addition, since the air intake port cover is secured to a power unit, it is not necessary to provide a stay for supporting the cover, which contributes to reduce the number of components.

In addition, since the air intake port cover serves as a bridge extending between the power unit and the air cleaner and as a decorative member, appearance of the side of the rear portion of the scooter-type vehicle can be improved.

The air intake port cover is also secured to an air cleaner case. The air cleaner case and the power unit are connected via the air intake port cover. Therefore, the entire rigidity can be increased.

DETAILED DESCRIPTION OF THE INVENTION

Figure 1:
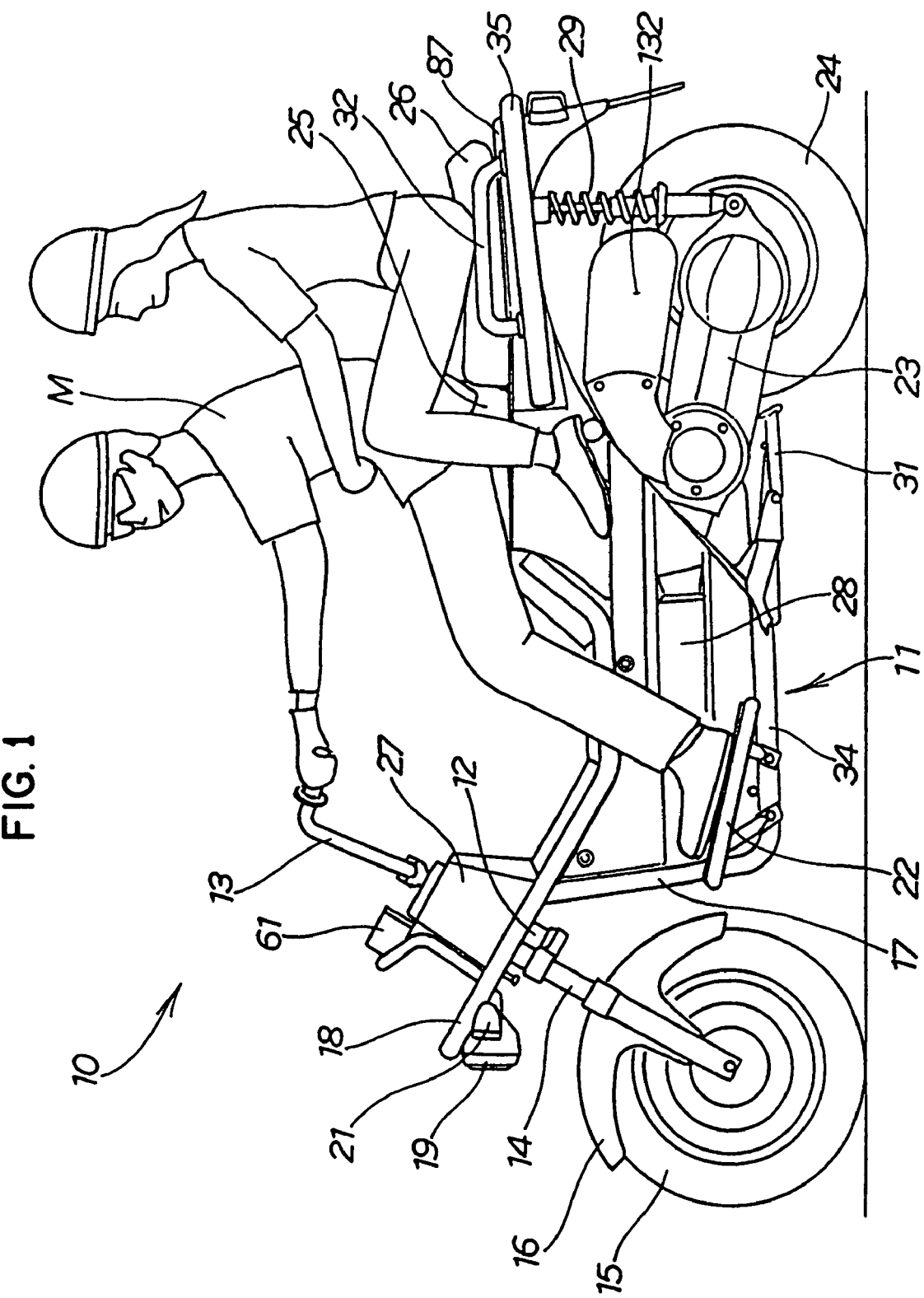
FIG. 1 is a side view of a scooter-type vehicle according to the present invention.

Referring now to the attached drawings, an embodiment of the present invention will be described below. The drawings are to be viewed in the orientation in which reference numerals are seen in the right way.

In the present embodiment, a scooter-type vehicle is taken as an example of a low-deck-type vehicle. However, the low-deck-type vehicle may be any of a two-wheeler, a three-wheeler, and a four-wheeler. The type of the vehicle is not limited as long as it is configured in such a manner that a front wheel and a rear wheel are provided at the front and the rear of a vehicle body frame, and a main frame, which is part of a vehicle body frame and extending rearward from a head pipe, is formed into a V-shape or an U-shape in side view, so that a rider can straddle the main frame easily.

FIG. 1 is a side view of a scooter-type vehicle according to the present invention. A scooter-type vehicle 10 is basically configured in such a manner that a steering handle 13 is steerably mounted to a head pipe 12 located at the front of a vehicle body frame 11, and a front wheel 15 and a front fender 16 are mounted to a front fork 14 connected to the steering handle 13.

It is a light vehicle built for two including a separate frame 18 mounted to the vehicle body frame 11, the separate frame 18 including a headlamp 19, and turn-signal indicators 21 mounted thereto, steps 22 mounted to a down tube 17, a power unit 23 mounted to the rear portion of the vehicle body frame 11 so as to be capable of swinging in the vertical direction, a rear wheel 24 mounted to the rear portion of the power unit 23, a rider's seat 25 disposed forwardly and obliquely upward of the rear wheel 24, and a fellow passenger's seat serving also as a seatback 26 provided upwardly of the rear wheel.

In the drawing, reference numeral 27 designates a handle post cover, reference numeral 28 designates a side cover, reference numeral 29 designates a rear cushion, reference numeral 31 designates a stand, and reference numeral 32 designates a grab rail.

Figure 2:
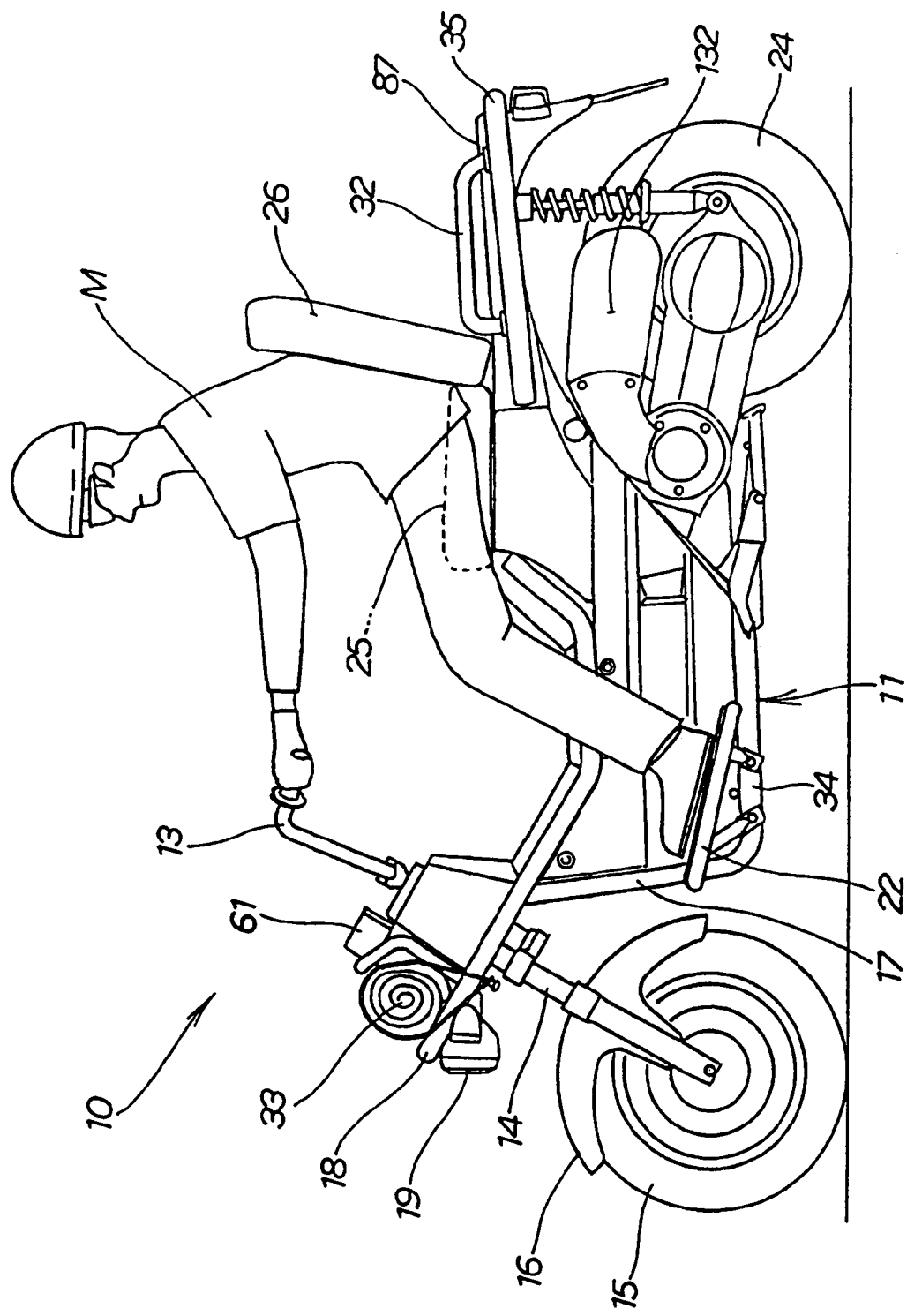
FIG. 2 is a side view of the scooter-type vehicle according to the present invention, showing a state of being converted into a one-seater specification.

FIG. 2 is a side view of a scooter-type vehicle according to the present invention, showing a state of being converted into a one-seater specification. Since the basic structure is the same as FIG. 1, the same reference numerals are used and the description is omitted. The drawing shows that the fellow passenger's seat which also serves as the seatback 26 is erected and changed into the form of a seatback for a rider M. It also shows that a load 33 such as a tent is placed at the front of the separate frame 18.

In addition, it is also characterized in that not only the steering handle 13 and the grab rail 32 but also the separate frame 18, the down tube 17, a lower pipe 34 extending from the down tube 17, and rear frames 35 are exposed.

In the scooter-type vehicle, it is normal that the vehicle body frame is covered with the vehicle body cover so that the most part of the vehicle body frame is prevented from being exposed. In contrast, in the present invention, the most part of the vehicle body frame is exposed so that an innovative feature of appearance is presented.

Figure 3:
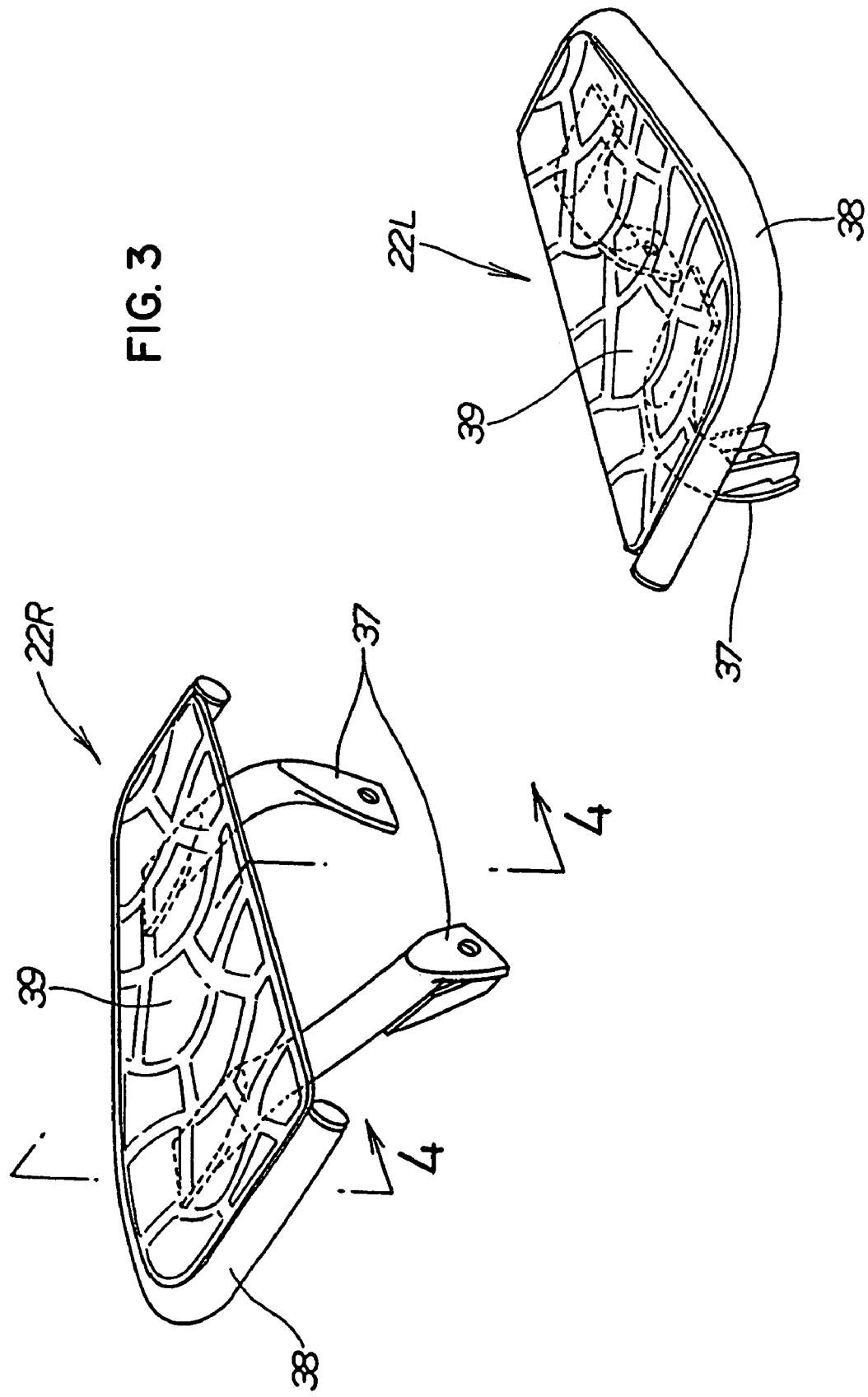
FIG. 3 is a perspective view of a step employed in the present invention.

FIG. 3 is a perspective view of a step which is employed in the present invention. A right step 22R on which the driver places his right foot (sign R stands for the right, hereinafter) includes a support plate 36, a stay 37 for connecting the support plate 36 to the down tube, a pipe 38 extending along the edge of the support plate 36, and a rubber plate 39 to be mounted on the top surface of the support plate 36. The rubber plate 39 may be made of a soft resin plate.

A left step 22L (sign L stand for the left, hereinafter) on which the left foot is placed has the same structure as the right step 22R. Therefore, it is represented by the same reference numeral, and will not be described again.

Figure 4:
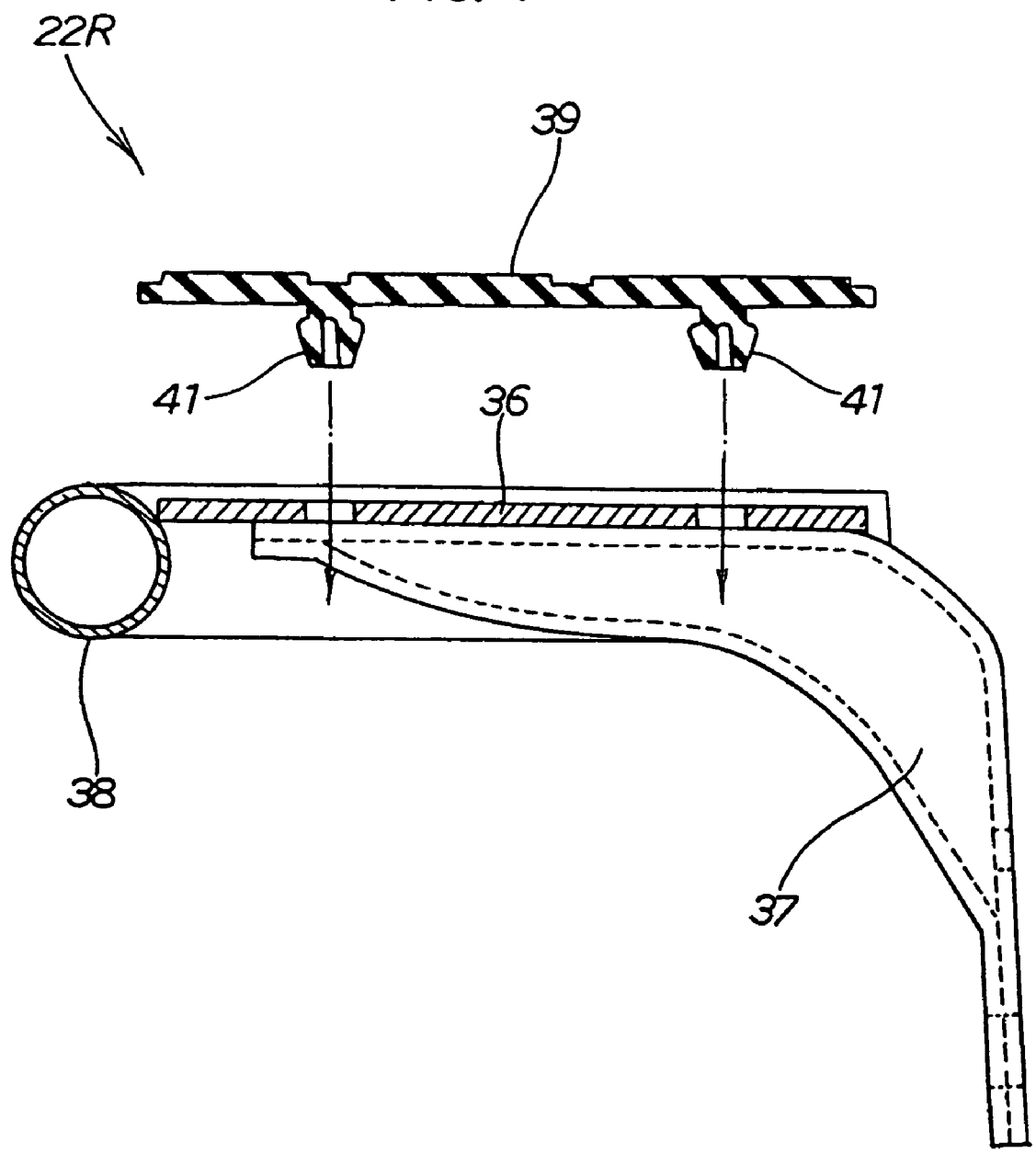
FIG. 4 is a cross-sectional view taken along the line 4—4 in FIG. 3.

FIG. 4 is a cross-sectional view taken along the line 4—4 in FIG. 3,. The rubber plate 39 includes so-called split-bulb-shaped locking projections 41, so that it is detachably attachable to the support plate 36.

The step may be a flat-type formed of aluminum die-cast. While the die-cast is preferably in terms of its good appearance, cost reduction is also expected for a middle-sized or smaller vehicle. Therefore, a step formed of steel plates assembled by welding is employed as well. However, it comes up short of the step formed of aluminum die-cast in terms of its weight and appearance.

From this point of view, the steps 22 (22L, 22R) of the present invention, having the pipe 38 extended along the edge of the support plate 36, realizes reduction in thickness and hence reduction in weight of the supporting plate 36 since the pipe 38 serves as a reinforcing material for the supporting plate 36. As a consequence, weight reduction and cost reduction are achieved while maintaining the appearance of the steps 22L, 22R in comparison with the die-cast step.

In addition, since the steps 22 according to the present invention can be manufactured by cutting a steel material, applying deformation processing such as bending or squeezing, and welding, a die or a die-cast machine are not necessary, whereby manufacturing cost may be reduced in comparison with the die-cast step.

Figure 5:
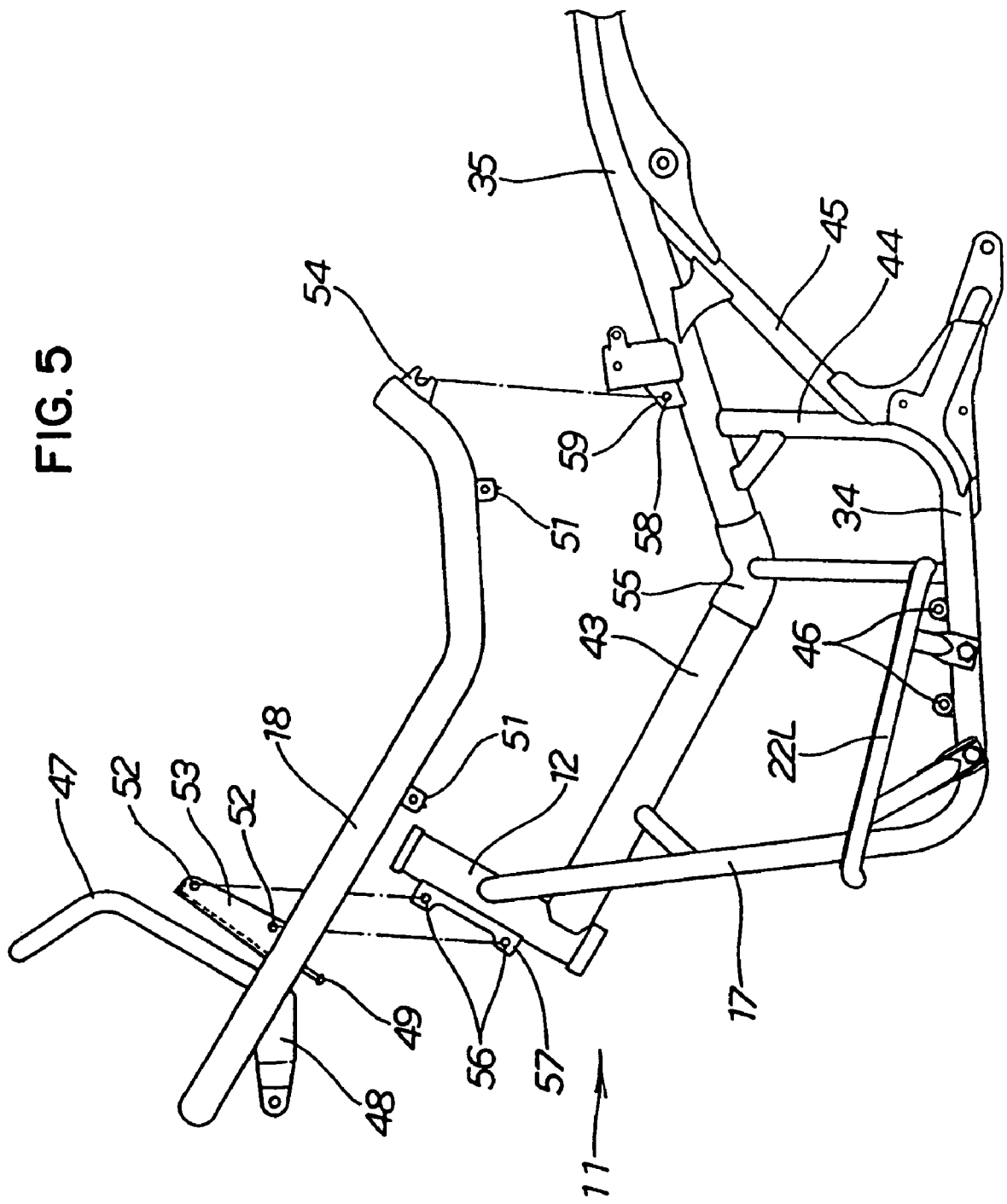
FIG. 5 is an exploded view of a vehicle body frame of a scooter-type vehicle according to the present invention.

FIG. 5 is an exploded view of a vehicle body frame of a scooter-type vehicle according to the present invention. The vehicle frame 11 includes a main frame 43 extending from the head pipe 12 and having a V-shape or an U-shape in side view, the rear frames 35 constituting the rear portion of the main frame 43 or extending rearwardly, the down tube 17 extending downward from the head pipe 12, the lower pipe 34 continuing from the down tube 17 and extending substantially horizontally, a center frame 44 extending upward from the rear end of the lower pipe 34, and a stay 45 connecting the center frame 44 and the rear frames 35. The lower pipe 34 is provided with cover-securing plates 46, 46.

A simple-shaped frame shown separately upward in the drawing is the separate frame 18.

Detail description of the separate frame 18 will be given below, and detailed description of the vehicle body frame 11 will be given later in conjunction with FIG. 23.

The separate frame 18 includes a load-carrying pipe 47 on the upper surface of the front portion thereof, a lamp-supporting bracket 48 and a loading hook 49 provided on the lower surface of the front portion, cover fixing plates 51, 51 provided on the lower surface thereof, a bracket 53 having holes 52, 52 provided on the upper surface of the front portion thereof, and an U-shaped bracket 54 provided on the lower surface of the rear portion thereof.

On the other hand, the head pipe 12 includes a front plate 57 having holes 56, 56 on the front surface thereof, and the rear frames 35 are each provided with a rear plate 59 having a hole 58 on the upper surface of the front portion thereof.

The rear plate 59 is disposed in the vicinity of a joint 55 between the main frame 43 and the rear frames 35. The joint 55 is a point where the single main frame 43 and two of the rear frames 35 are converged, and is high in rigidity. Provision of the rear plate 59 in the vicinity (rearwardly, in the embodiment) of the highly-rigid joint 55 is advantageous in terms of strength for supporting the separate frame 18.

The bracket 53 is secured to the front plate 57 with a bolt, and the U-shaped bracket 54 is secured to the rear plate 59 with a bolt, so that the separate frame 18 can be unitized with the head pipe 12 and the main frame 43. The form after unitization will be described in conjunction with FIG. 7.

Figure 6:
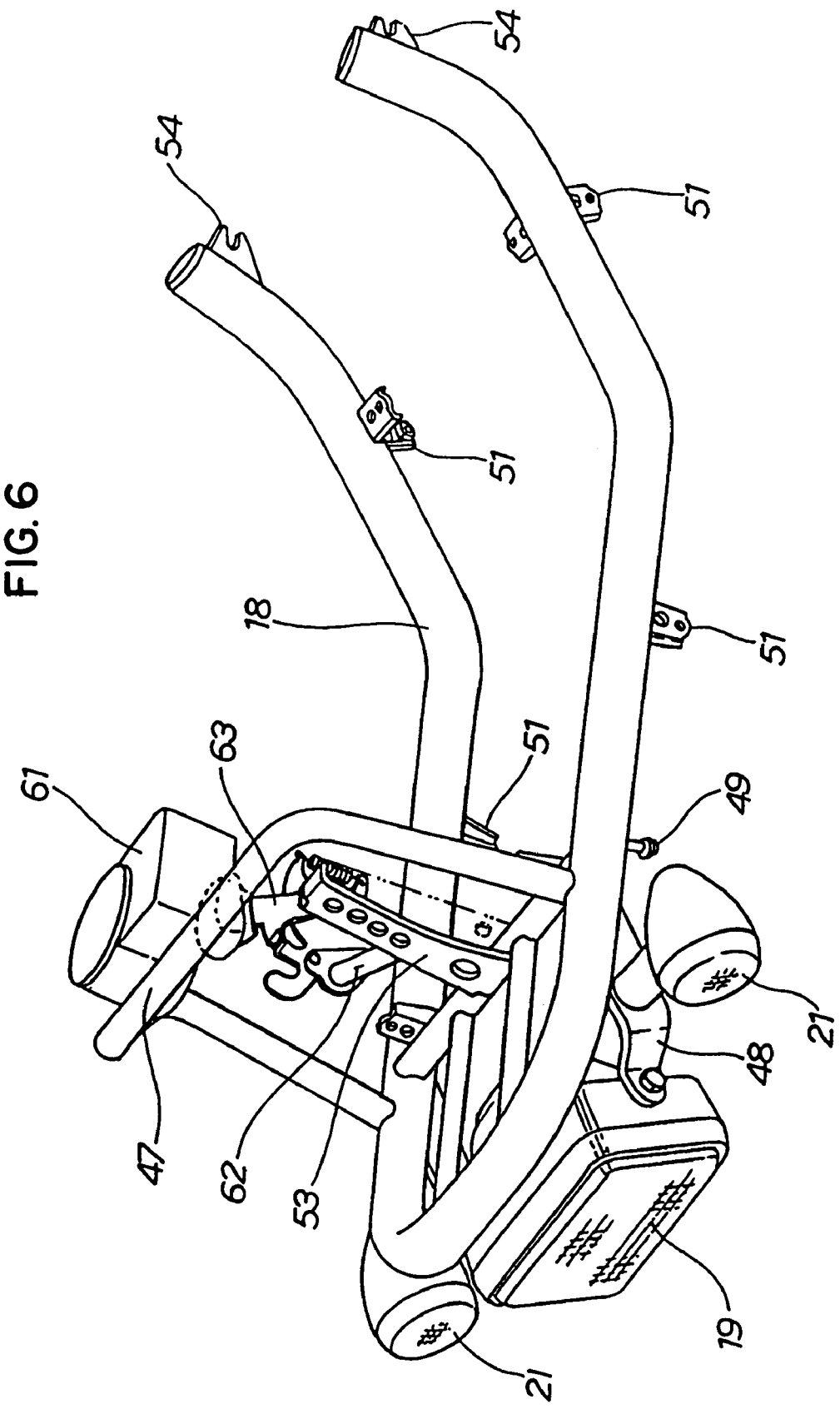
FIG. 6 is an explanatory drawing showing the operation of a separate frame according to the present invention.

FIG. 6 is an explanatory drawing showing an operation of the separate frame according to the present invention. The separate frame 18 is an useful pipe frame having an U-shape in plan view, and is configured in such a manner that the turn-signal indicators 21, 21 and the headlamp 19 can be mounted to the lamp-supporting brackets 48, a meter unit 61 can be mounted to the load-carrying pipe 47, and a parking brake lever set 63 can be mounted to the right side of the bracket 53 via a stay 62.

On the other hand, for example, by assembling vehicle components such as the turn-signal indicators 21, the headlamp 19, the meter unit 61, and the parking brake lever set 63 to the separate frame 18 in advance (which is referred to as sub-assembly), and mounting the sub-assembly (the entire assembly shown in FIG. 6) to the head pipe 12 and the main frame 43 shown in FIG. 5, time required for assembling in the assembling line may be reduced.

Figure 7:
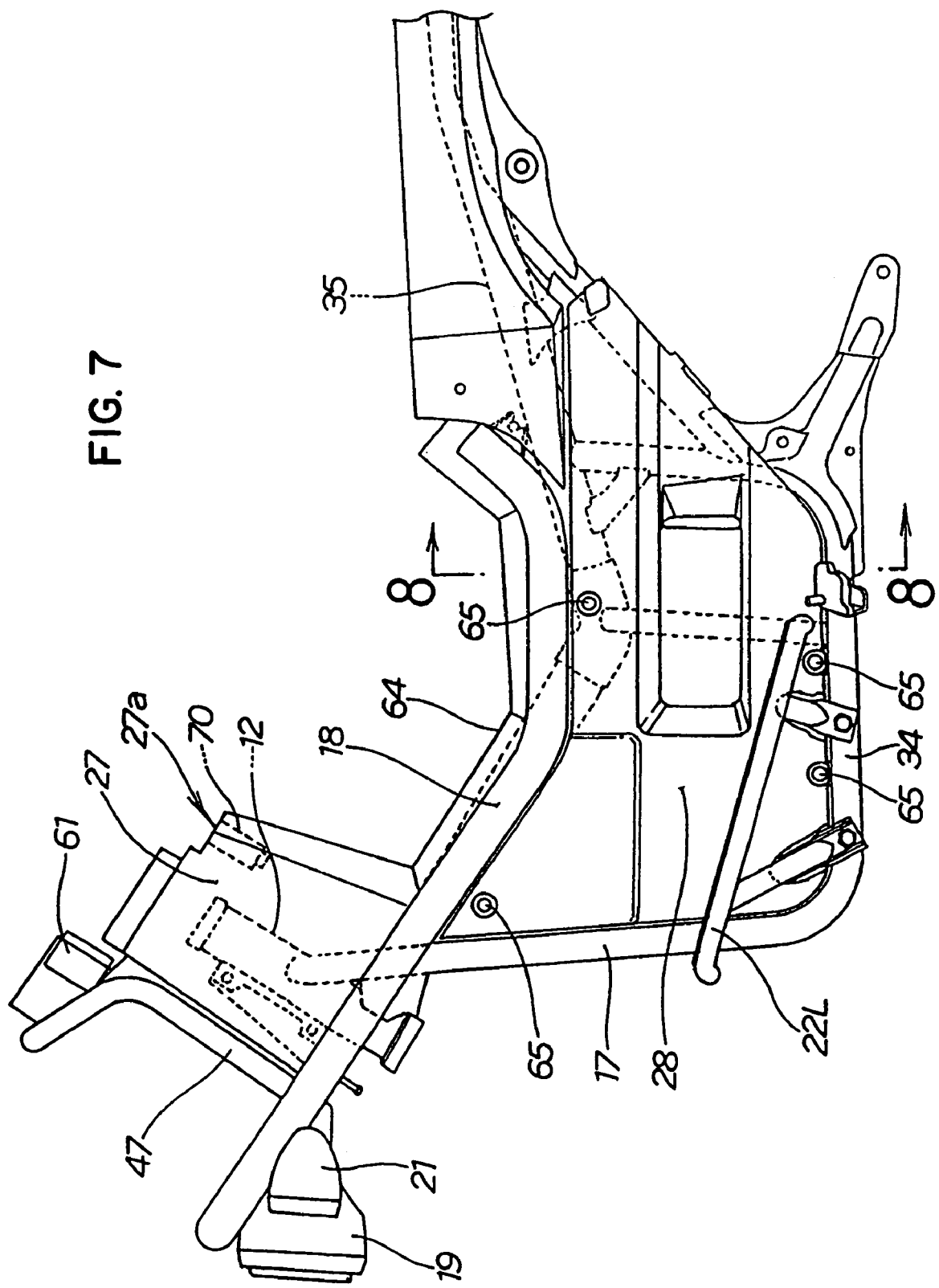
FIG. 7 is a side view of the vehicle body frame of the scooter-type vehicle according to the present invention

FIG. 7 is a side view of the vehicle body frame of the scooter-type vehicle according to the present invention, showing that the separate frame 18 is mounted to the head pipe 12 and the rear frames 35, a center cover unit 64 having an integrally formed handle post cover 27 is covered thereon, a side cover 28 is mounted between the separate frame 18 and the lower pipe 34 with bolts 65, and the step 22L is attached to the lower pipe 34.

As shown in the drawing, the front surface of the handle post cover 27 is a flat surface so that the space for the front load-carrying space can sufficiently be secured.

The upper rear portion of the handle post cover 27 is formed with a shelf section 27a which forms a set-back step, so that a combination-lock device 70 (detailed structure will be described later) can be mounted to the shelf section 27.

Figure 8:
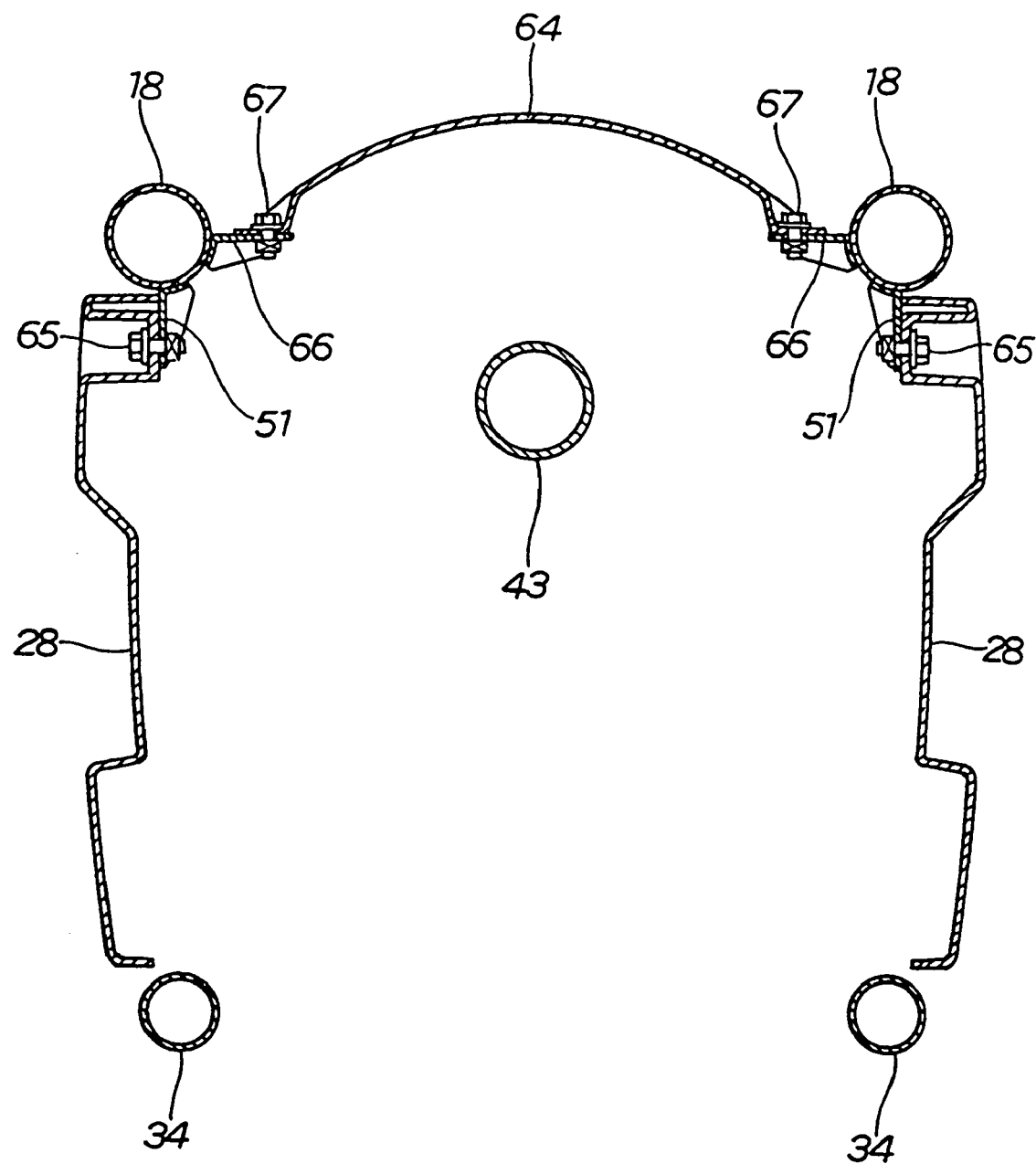
FIG. 8 is a cross-sectional view taken along the line 8—8 in FIG. 7.

FIG. 8 is a cross-sectional view taken along the line 8—8 in FIG. 7, showing that the center cover unit 64 is mounted to the cover-securing plates 66, 66 provided on the separate frame 18 with the bolts 67, 67, and the side covers 28, 28 are mounted to the cover-securing plates 51, 51 with the bolts 65, 65.

Assuming that an attempt is made to secure the center cover unit 64 or the side covers 28, 28 to the main frame 43 with bolts, large-scaled cover-mounting brackets are required.

From this point of view, the present invention is characterized in that the separate frames 18, 18 (although the separate frame 18 is a single unit, it is represented by two reference numerals for the sake of convenience) are disposed upwardly of the left and right lower pipes 34, 34, and the center cover unit 64 and the side covers 28, 28 are mounted tactfully utilizing the separate frames 18, 18.

Consequently, the separate frames 18, 18 can be utilized for fixing the load or the like. In addition, since the center cover unit 64 and the side covers 28, 28 (these covers are referred to as a vehicle body cover) are disposed inside the separate frames 18, 18 and the left and right lower pipes 34, 34, the vehicle body cover can be downsized as a whole, and reduction of weight and cost of the vehicle body cover is achieved.

Furthermore, since the box-shaped vehicle body cover is surrounded by the separate frames 18, 18 and the lower pipes 34, 34, the container-looked appearance of the pipe frame as a whole is achieved, and hence the appearance can be improved.

As clearly shown in the drawing, the large-scaled cover-mounting brackets are not necessary, whereby reduction of cost for manufacturing the vehicle body frame is achieved.

Subsequently, a handle lock mechanism provided as an anti-theft measure will be described. In the present invention, a so-called combination-lock device in which a handle lock mechanism is built in the combination switch is employed.

Figure 9:
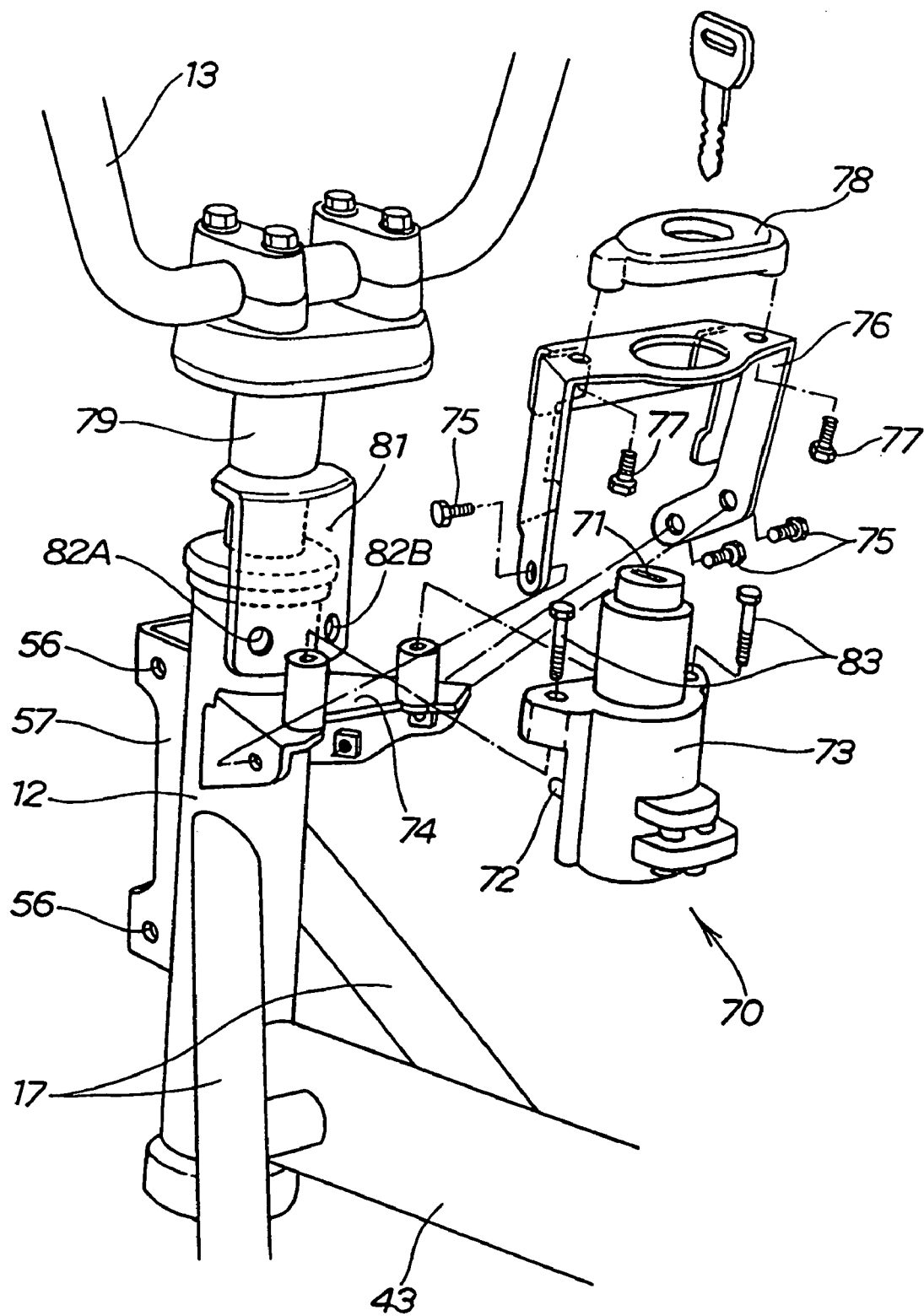
FIG. 9 is an exploded perspective view of the combination-lock device according to the present invention.

FIG. 9 is an exploded perspective view of the combination-lock device according to the present invention. The combination-lock device 70 includes a key hole 71, a combination-lock unit 73 having switches (not shown since they are integrated therein) and a pin-driving mechanism for taking a lock pin 72 in and out (not shown since it is integrated therein), a unit-supporting bracket 74 for mounting the combination-lock unit 73 to the head pipe 12, an inverted angular U-shaped bracket 76 to be fixed to the unit-supporting bracket 74 with three of screws 75, a shutter housing 78 to be fixed to the inverted angular U-shaped bracket 76 with bolts 77, 77 to be screwed from below, and a lock plate 81 fixed to a steering shaft 79 by welding.

The lock plate 81 includes two lock holes 82A, 82B. The head pipe 12 is non-rotatable member and the steering shaft 79 is a rotatable member. Therefore, the handle can be locked by retaining the steering shaft 79 side onto the head pipe 12. The combination-lock device 70 of the present invention is configured based on this principle.

In order to achieve the above-described principle, the combination-lock unit 73 is fixed to the unit-supporting bracket 74 provided on the backside of the head pipe 12 with bolts 83, 83, and the inverted angular U-shaped bracket 76 is mounted to the combination-lock unit 73 so as to cover thereon. The shutter housing 78 is preferably secured to the inverted angular U-shaped bracket 76 with bolts in advance.

Figure 10:
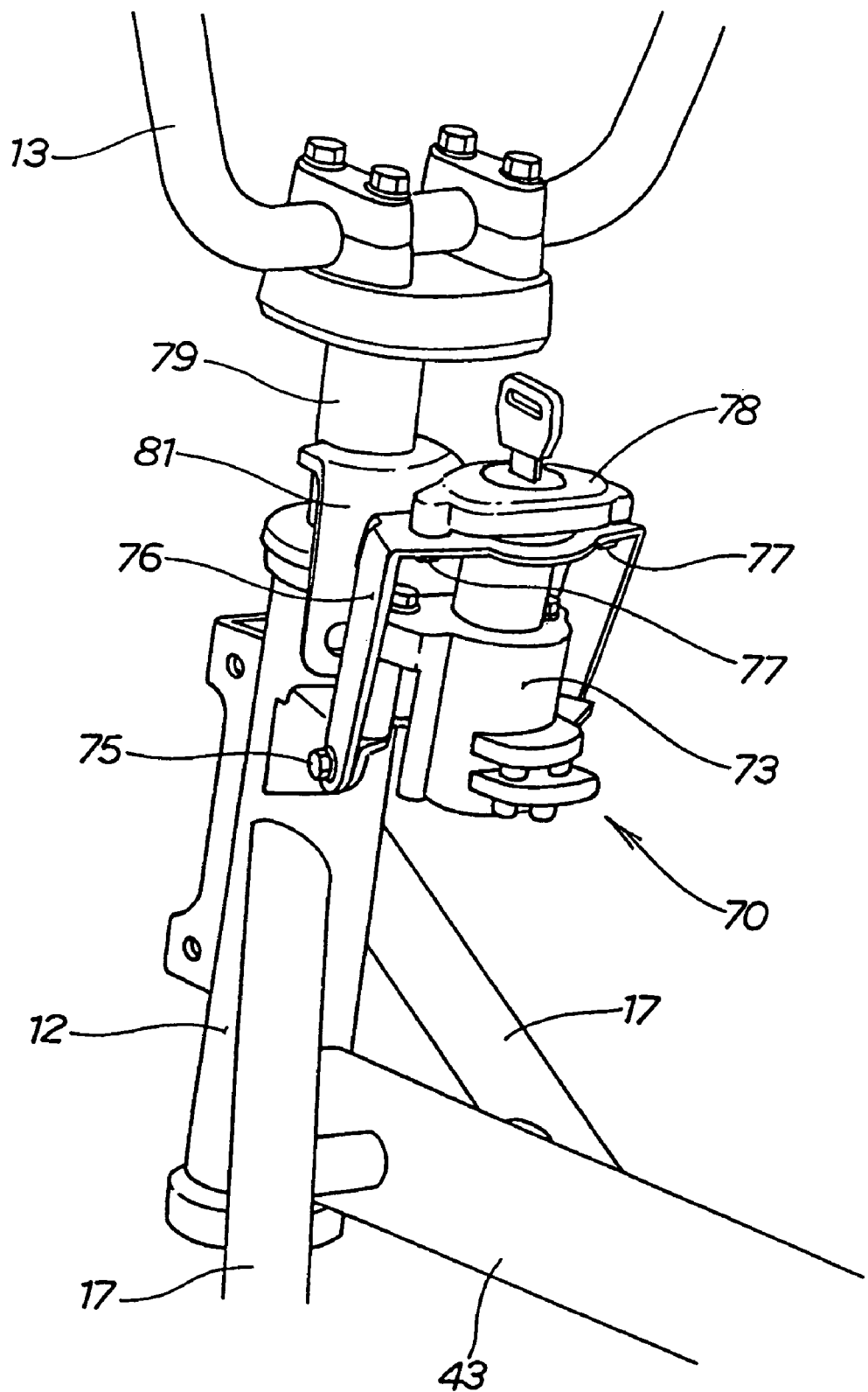
FIG. 10 is a perspective view of the combination-lock device according to the present invention.

FIG. 10 is a perspective view of the combination-lock device according to the present invention, characterized in that the shutter housing .78 is placed on the inverted angular U-shaped bracket 76, which is mounted to the combination-lock unit 73 so as to cover thereon, and the shutter housing 78 is fixed with the bolts 77, 77 to be screwed from below.

As shown in FIG. 7, the head pipe 12 and the steering shaft 79 are covered with the handle post cover 27. Consequently, the most part of the combination-lock device 70 shown in FIG. 10 is covered with the handle post cover, and only the shutter housing 78 is exposed. Since the bolts 77, 77 are invisible, and in addition, the heads of the bolts 77, 77 are located on the lower side, the bolts 77, 77 cannot be loosened easily from above. Consequently, the shutter housing 78 is hardly removed, and hence the possibility that the combination-lock unit 73 becomes damaged.

Figure 11A:
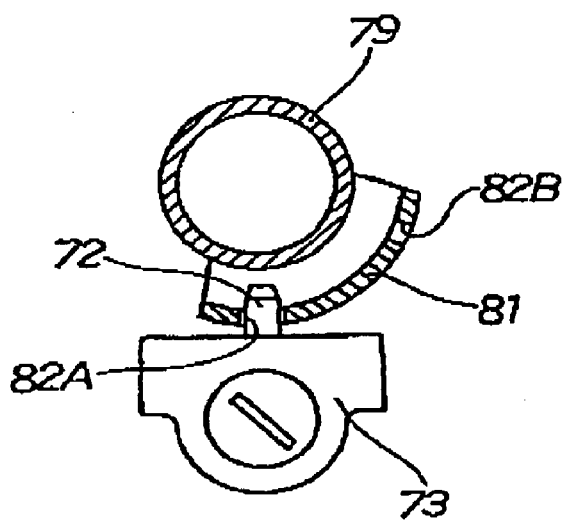
FIGS. 11A–C are comparative drawings between new and old combination-lock devices.
Figure 11B:
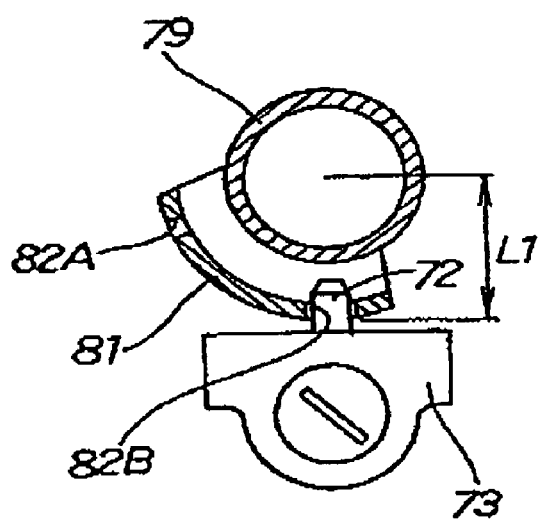
Figure 11C:
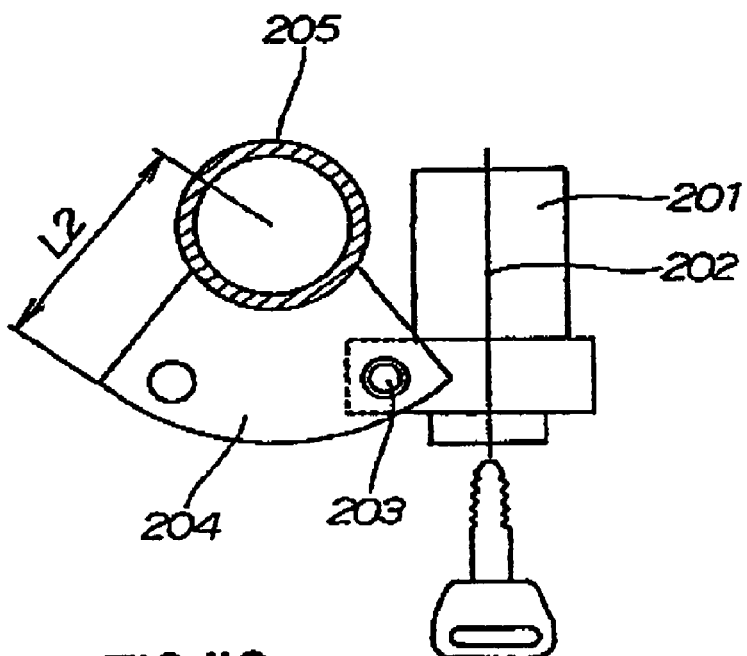

FIGS. 11(a)–(c) are comparative drawings comparing the new combination-lock device with an old type of combination-lock device. The drawings (a) and (b) show the operation according to the present invention, and (c) shows the operation relating to a product in the related art.

The drawing (a) shows a state in which the steering shaft 79 is rotated almost to the leftmost position, and the lock pin 72 is inserted into the lock hole 82A.

The drawing (b) shows a state in which the steering shaft 79 is rotated almost to the rightmost position, and the lock pin 72 is inserted into the lock hole 82B.

The combination-lock unit 73 is characterized in that the longitudinal axis thereof extends in the direction perpendicular to the plane of the drawing, the longitudinal axis extends in substantially parallel with the steering shaft 79, and the lock pin 72 is oriented horizontally. As a consequence, the length LI from the center of the steering shaft 79 to the outer surface of the lock plate 81 may be shortened.

The drawing (c) shows a product in the related art, in which the longitudinal axis 202 of the combination-lock unit 201 (parts in the related art or in the comparative example are represented by numerals of 200s, hereinafter) are oriented horizontally, a lock pin 203 is moved in the vertical direction, and the lock plate 204 is formed of a fan-shaped plate. The length L2 from the center of the steering shaft 205 to the outer surface of the lock plate 204 increases. In addition, since the area in plan view of the lock plate 204 and the combination-lock unit 201 are large, other devices can hardly be arranged around the steering shaft 205.

From this point of view, according to the present invention shown in the drawings (a) and (b), other devices can easily be arranged around the steering shaft 79.

Subsequently, the driver's seat 25 and the fellow passenger's seat serving as a seatback 26 according to the present invention will be described in detail.

Figure 12:
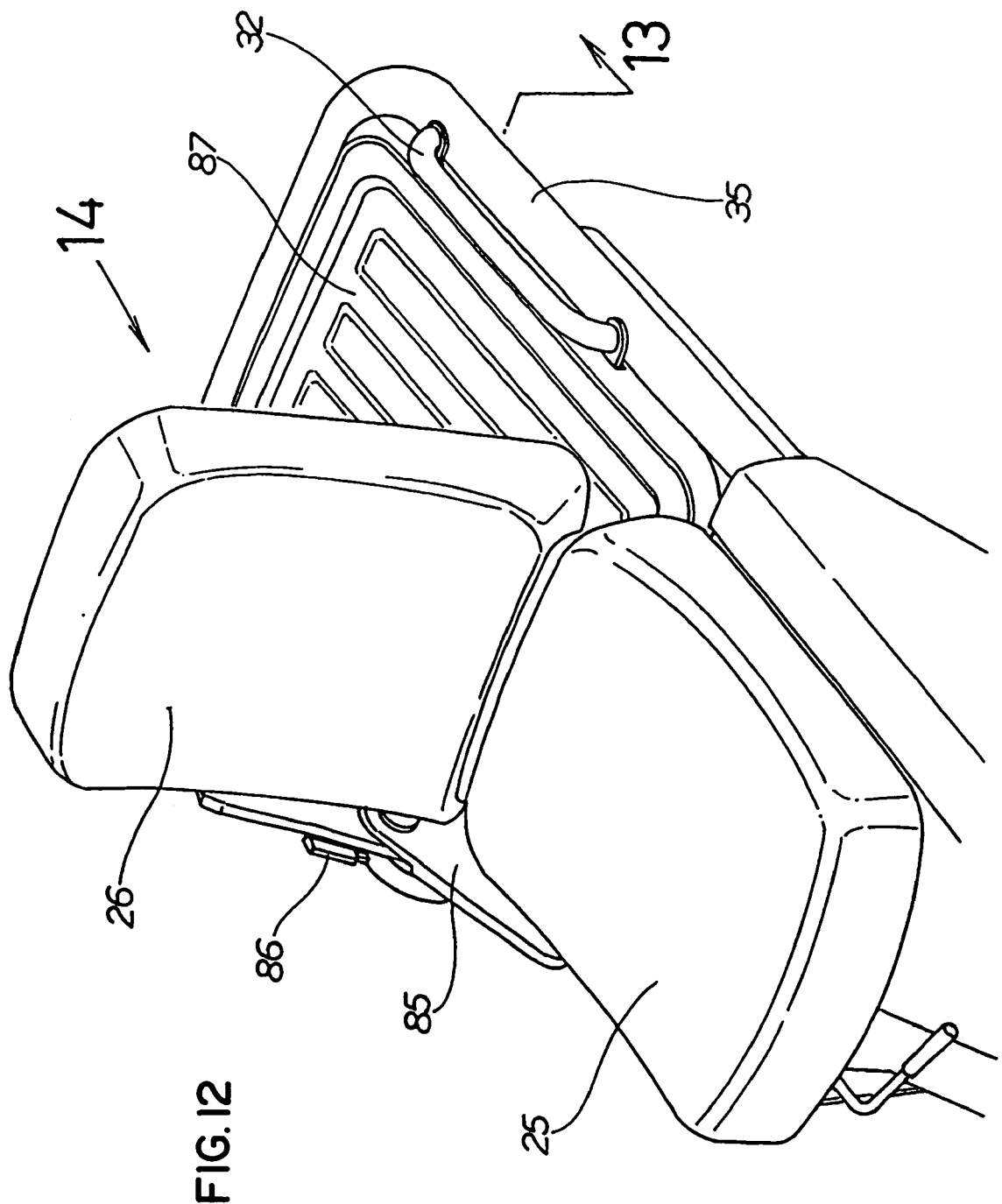
FIG. 12 is a perspective view showing a rear load carrier according to the present invention.

FIG. 12 is a perspective view showing a rear load carrier according to the present invention. By placing the passenger's seat serving as a seatback 26 upright, the rider's seat 25 is converted into a seat with a seatback. The angle of the passenger's seat serving as a seatback 26 can be changed by operating a lock lever 86 provided on a connecting link 85.

The drawing also shows that a rear load carrier 87 and the grab rail 32 are provided on the rear frames 35.

The rear load carrier 87 formed of a plate with patterned indents formed of resin or light metal. With the plate with patterned indents, the section module can significantly be increased in comparison with a flat plate, whereby larger volume of load can be placed.

Figure 13:
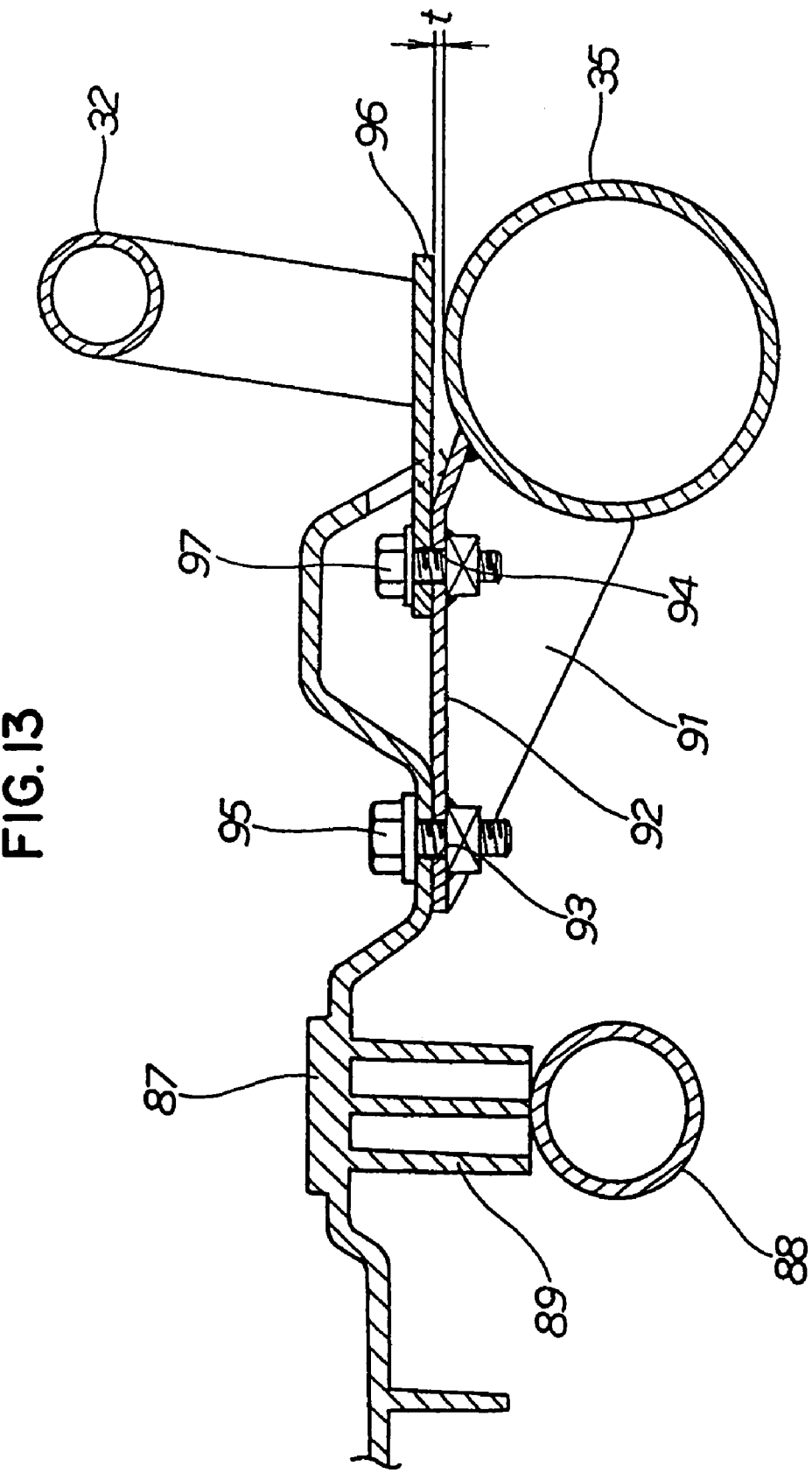
FIG. 13 is a cross-sectional view taken along the line 13 in FIG. 12.

FIG. 13 is a cross-sectional view taken along the line 13 in FIG. 12, showing that inner rail 88 is disposed in parallel with the rear frame 35 on the side of the center of the vehicle body (left side in the drawing) with respect to the rear frame 35, so that a leg 89 extending downward from the rear load carrier 87 can be placed.

A triangular bracket 91 is extended from the round-pipe-shaped rear frame 35 toward the center of the vehicle body, two holes 93, 94 are formed on a top plate 92 of the triangular bracket 91, and the rear load carrier 87 is fixed to the inner hole 93 with a bolt 95. The drawing shows that a base 96 of the grab rail 32 is mounted to the outer hole 94 with a bolt 97.

The top plate 92 of the triangular bracket 91 is set to a higher level upward from the top surface of the rear frame 35 by a distance of t. The distance t is 1 to 2 mm. The reason why such a configuration is employed is as follows.

When a configuration in which the round-pipe-shaped grab rail 32 is directly mounted to the round-pipe-shaped rear frame 35 is employed, it is required to place the lower end of the grab rail 32 to the rear frame 35 and weld the abutted portion. Alternatively, when it is secured by a bolt-on type so as to be capable of detaching and attaching, the secured portion becomes visible.

Therefore, in the present invention, the base 96 is extended from the lower end of the grab rail 32, and the extremity of the base 96 is inserted under the rear load carrier 87 before securing it to the triangular bracket 91 with bolts. Since it is detachably attached, and the secured portion is invisible, a good appearance is achieved.

The grab rail 32 is exerted with a force, as a matter of course, and hence the base 96 is deflected in the vertical direction. The base 96 may interfere with the rear frames 35.

Therefore, regarding the base 96 as a cantilever, the deflection is calculated and the distance t is set to a value exceeding the expected deflection, so that interference is prevented.

Figure 14:
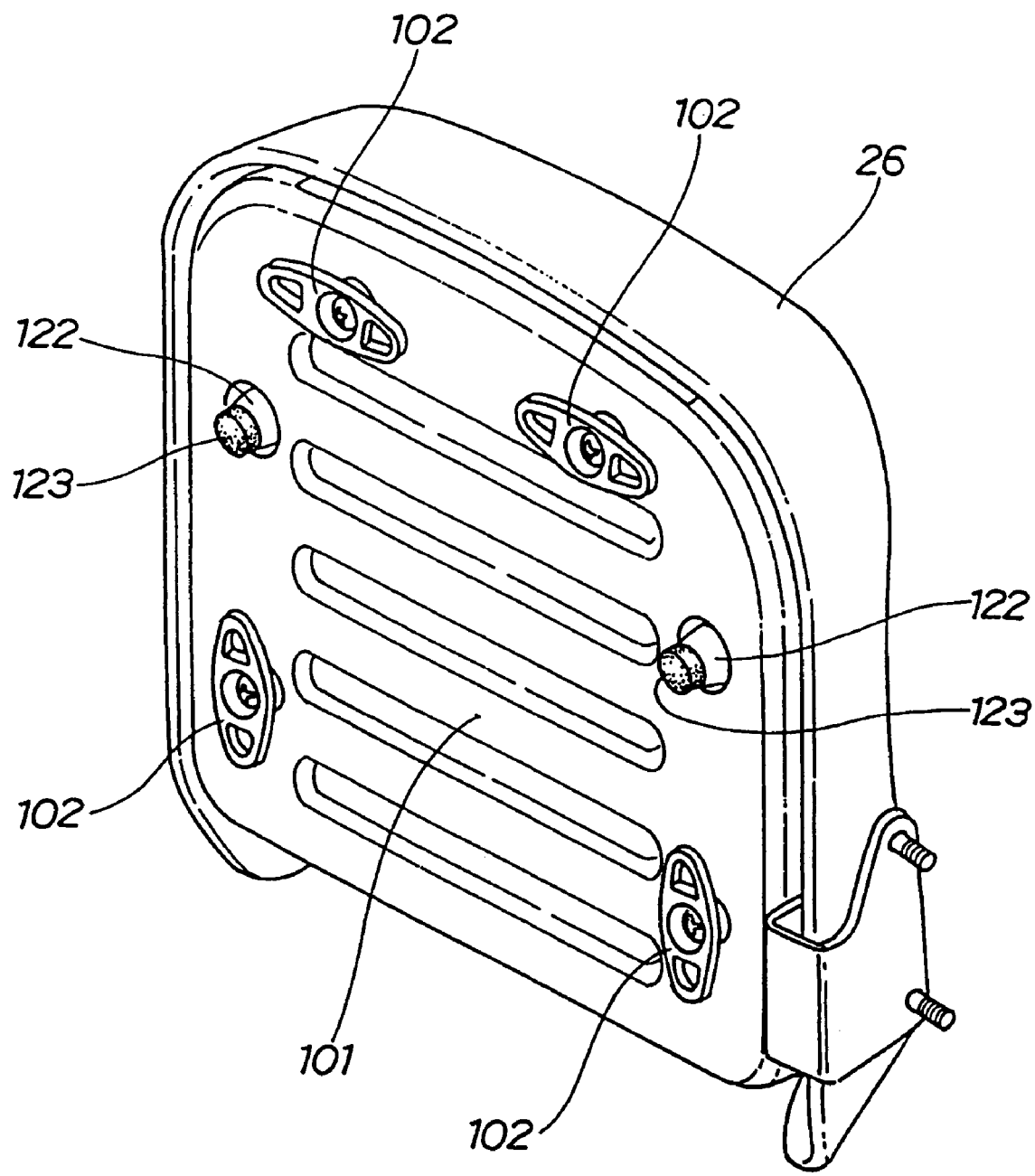
FIG. 14 is a drawing viewed in the direction indicated by an arrow in FIG. 12.

FIG. 14 is a drawing of a view in the direction indicated by an arrow 14 in FIG. 12, and showing the structure of a back surface (bottom surface) of the passenger's seat serving as a seatback 26. The passenger's seat serving as a seatback 26 is characterized in that a seat bottom plate (represented by reference numeral 98 in FIG. 17, described later) surrounding the cushion material is further surrounded by a back plate 101, and the back plate 101 is provided with four T-shaped hooks 102, for example, at the left and right on the upper side and the left and right on the lower side.

The back plate 101 serves as a decorative member when no load is placed on the rear portion of the vehicle body, a good-looking plate member is used. In addition, it is necessary to increase in rigidity since a bending force is exerted from the T-shaped hooks 102. Therefore, the back plate 101 is formed with patterned indents, to increase the section modulus. A steel plate and a resin plate are suitable for the back plate 101, and since it is a decorative member, it is applied with surface preparation such as coating, plating, or coloring.

Figure 15:
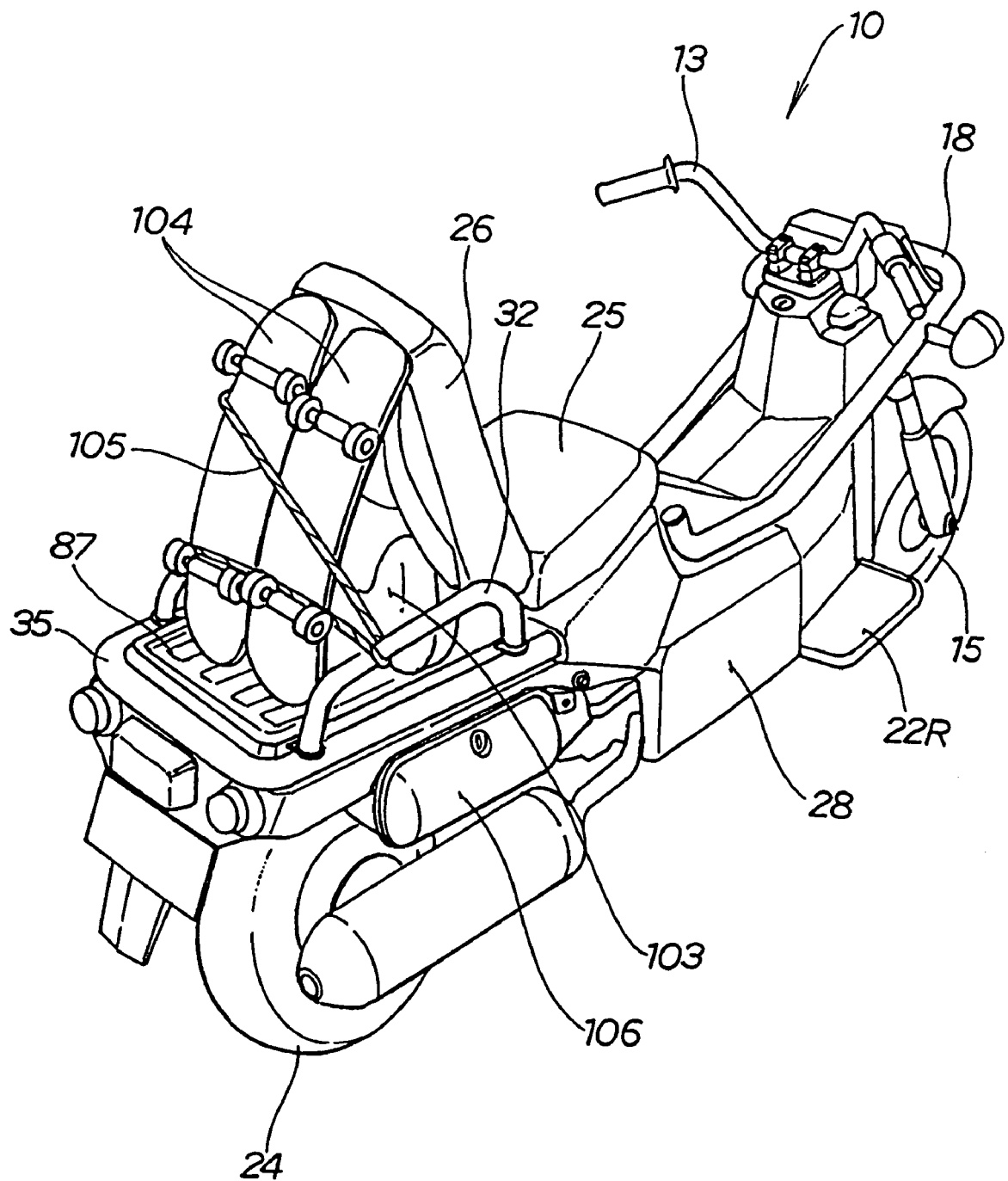
FIG. 15 is a back side view of a scooter-type vehicle according to the present invention.

FIG. 15 is a back side view of a scooter-type vehicle according to the present invention, showing a state in which a bag 103 or a skate boards 104, 104 are placed on the rear load carrier 87, and the loads are secured by tying a rope 105 around the grab rail 32 and the passenger's seat serving as a seatback 26 (T-shaped hooks, not shown).

When there is provided only a horizontal rear load carrier 87, the loads move in the fore-and-aft direction when being braked suddenly. In the present invention, the forward movement is prevented by the presence of the passenger's seat serving as a seatback 26, and the rearward movement is prevented by tying the rope 105 around the T-shaped hooks, not shown.

In this manner, a large amount of loads can be carried stably on the rear load carrier 87.

While a dough box 106 is provided on the right side of the rear load carrier 87, the dough box 106 will be described in detail later.

Figure 16:
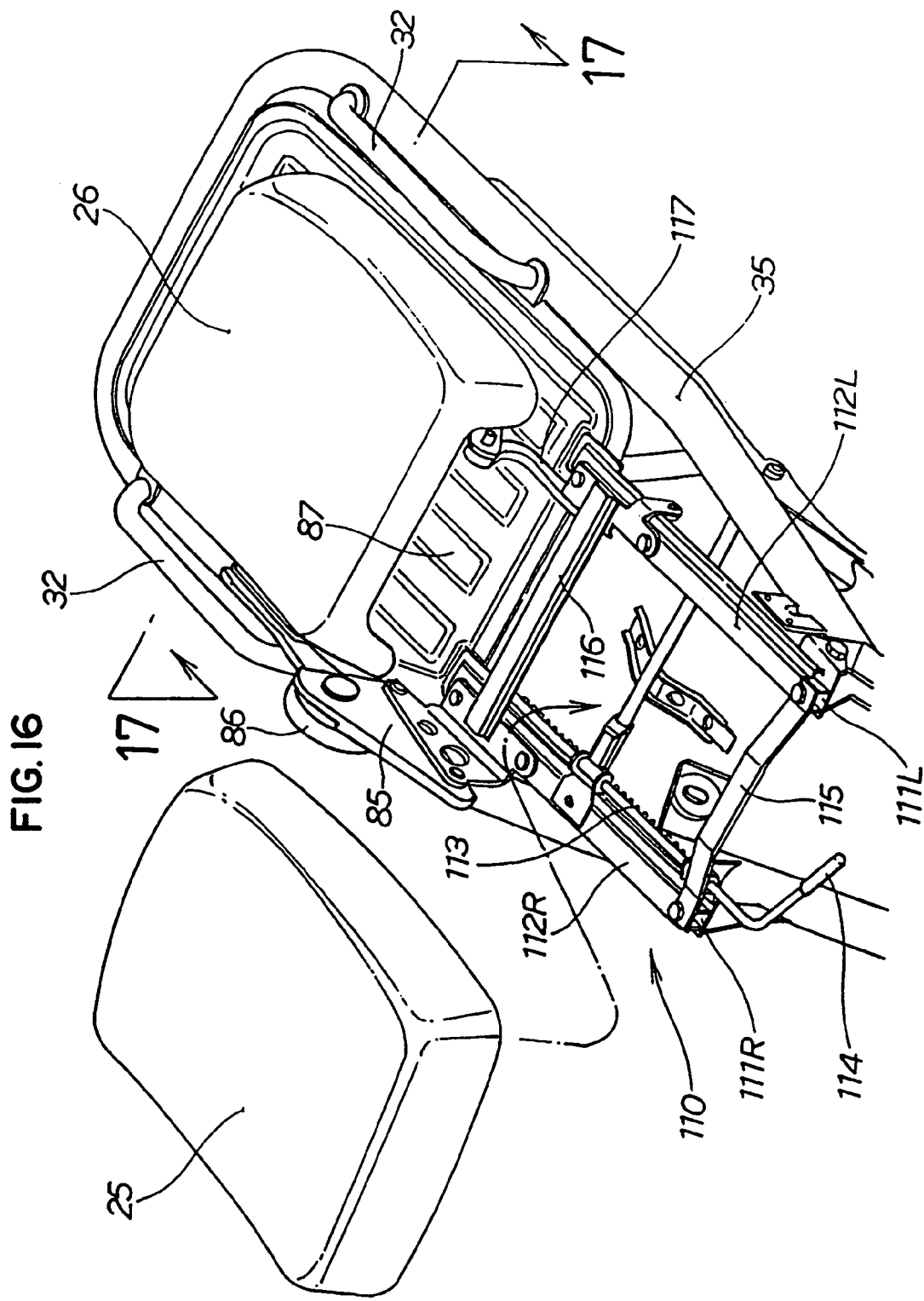
FIG. 16 is an explanatory drawing of a seat slide mechanism employed in the present invention.

FIG. 16 is an explanatory drawing of a seat slide mechanism employed in the present invention. The position of the rider's seat 25 of the present invention can be moved in the fore-and-aft direction depending on the taste of the rider, and to do so, a seat slide mechanism 110 is provided at the rear portion of the vehicle body.

The seat slide mechanism 110 includes left and right seat rails 111L, 111R, left and right sliders 112L, 112R slidably mounted to the front and the rear of the seat rails 111L, 111R, saw-toothed member 113 for a slide lock provided on the right slider 112R, an operating lever 114 for rotating the saw-toothed member 113 and switching it into a locked sate/an unlocked state, front and rear cross members 115, 116 for connecting the left and right sliders 112L, 112R with each other, the connecting link 85 extending from the rear end of the right slider 112R, and a link 117 extending from the rear end of the left slider 112L.

The left and right sliders 112L, 112R can be moved freely in the fore-and-aft direction.

The rider's seat 25 is fixed to the left and right sliders 112L, 112R, and the passenger's seat serving as a seatback 26 is fixed to the connecting link 85 and the link 117. Consequently, the rider can unlock the slide lock by operating the operating lever 114 to move the rider's seat 25 and the passenger's seat serving as a seatback 26 to a desired position in the fore-and-left direction, and then can lock the rider's seat 25 and the passenger's seat serving as a seatback 26 at the desired position by returning the operating lever 1.

When the rider or the fellow passenger operates the lock lever 86, the passenger's seat serving as a seatback 26 can be oriented horizontally as shown in the drawing.

Figure 17:
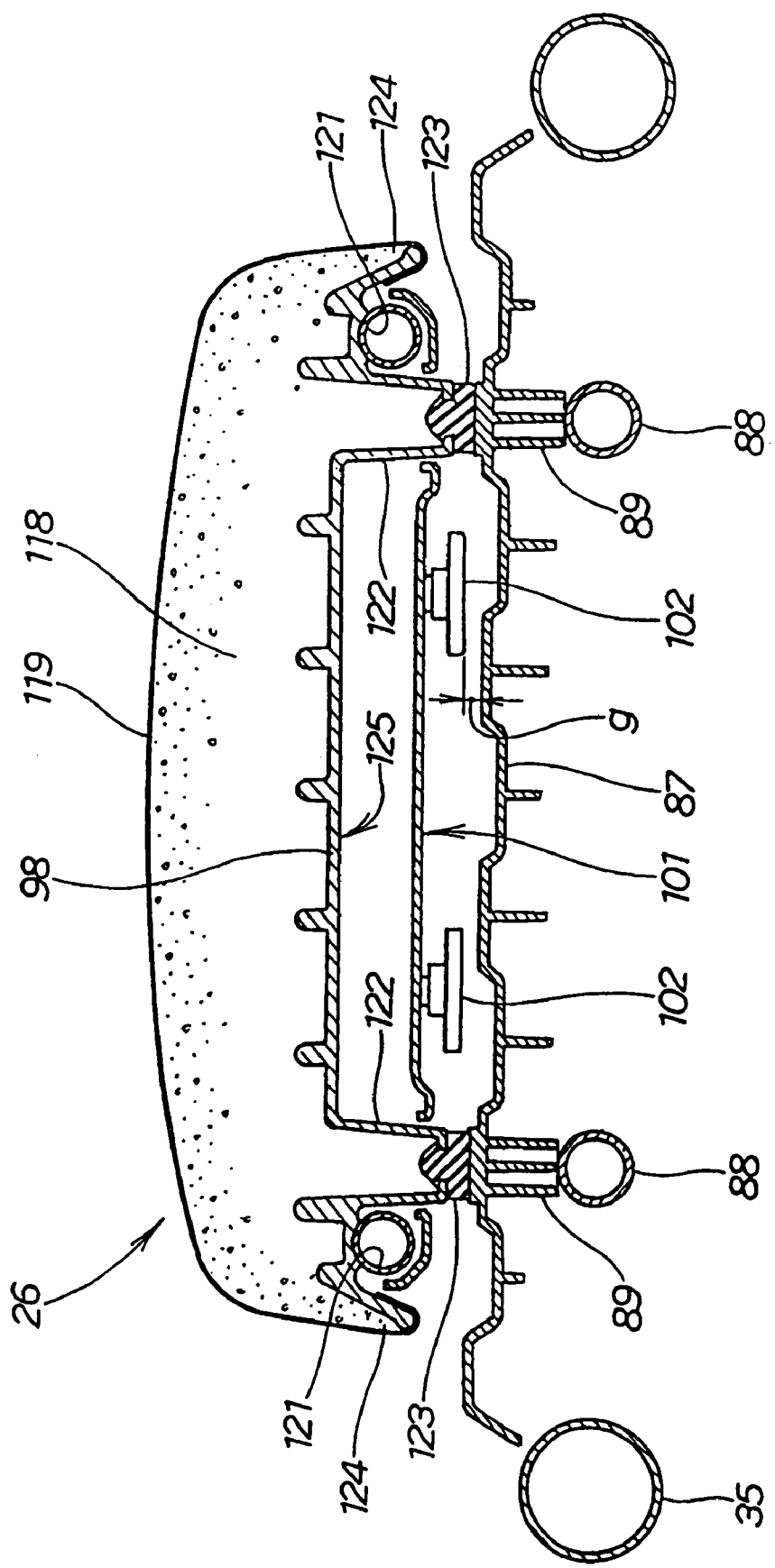
FIG. 17 is a cross sectional view taken along the line 17—17 in FIG. 16 (Grab rail is omitted).

FIG. 17 is a cross-sectional view taken along the line 17—17 in FIG. 16 (grab rail is omitted). Explaining the cross-sectional structure of the passenger's seat serving as a seatback 26 first, the passenger's seat serving as a seatback 26 is a structure basically including a cushion material 118 such as sponge, an external skin 119, and the seat bottom plate 98, in which a reinforcing rib 121 is laid along the seat bottom plate 98, legs 122, 122 are extended from the seat bottom plate 98, and pads 123, 123 are attached to the extremities (lower end in the drawing) of the legs 122, 122. The reinforcing rib 121 is to be connected to the link 117 in FIG. 16.

The edges 124, 124 of the seat bottom plate 98 are protruded downward so as to provide a sense of thickness to the seat, and a recess 125 is formed at the center portion. The recess 125 and the reinforcing rib 121 are covered with the back plate 101 together and improve the appearance of the passenger's seat serving as a seatback 26 when it is placed in the upright position.

The legs 122, 122 are formed at the positions corresponding to the left and right inner rails 88, 88 so as to project therefrom. Accordingly, the weight of the fellow passenger can be supported directly by the inner rails 88, 88 via the legs 122, 122 and the legs 89, 89 of the rear load carrier 87. Only a compressing force is exerted to the legs 89, 89 of the rear load carrier 87, and no bending force is exerted to the rear load carrier 87.

The height of the T-shaped hooks 102, 102 are determined so that a gap g is secured from the rear load carrier 87. The gap g is 4 to 5 mm.

Generally, in a small vehicle, there is a case in which a tiltable hook or a retractable hook is employed on the load carrier. It is because the hook can be stored when not in use to maintain the appearance, and the hook can be upsized to secure the margin to hook the rope since it is adapted to be pulled out only in use.

However, when the passenger's seat serving as a seatback 26 is moved down in a state in which the tiltable hook or the retractable hook is in the pulled-out state by mistake, the rear load carrier 87 may become damaged, and the hook may also become damaged.

From this point of view, the present invention employs a fixed hook. With the fixed hook, it is not necessary to worry about whether or not it is retracted, and hence the related components are not subjected to damages. However, since there is a limit on a space for mounting the hook, upsizing of the fixed hook is impossible. Therefore, the T-shaped hook 102 is employed. With the T-shape, two claws can be secured on the left and right sides of the lateral rod of T with the vertical rod of T as a center, and hence the rope can be sufficiently hooked on the vertical rod and two of the left and right claws. That is, the T-shaped hook can provide a relatively large margin for the rope although it is smaller than the L-shaped hook.

Subsequently, the dough box 106 provided below the rear load carrier on the right side will be described in detail.

Figure 18:
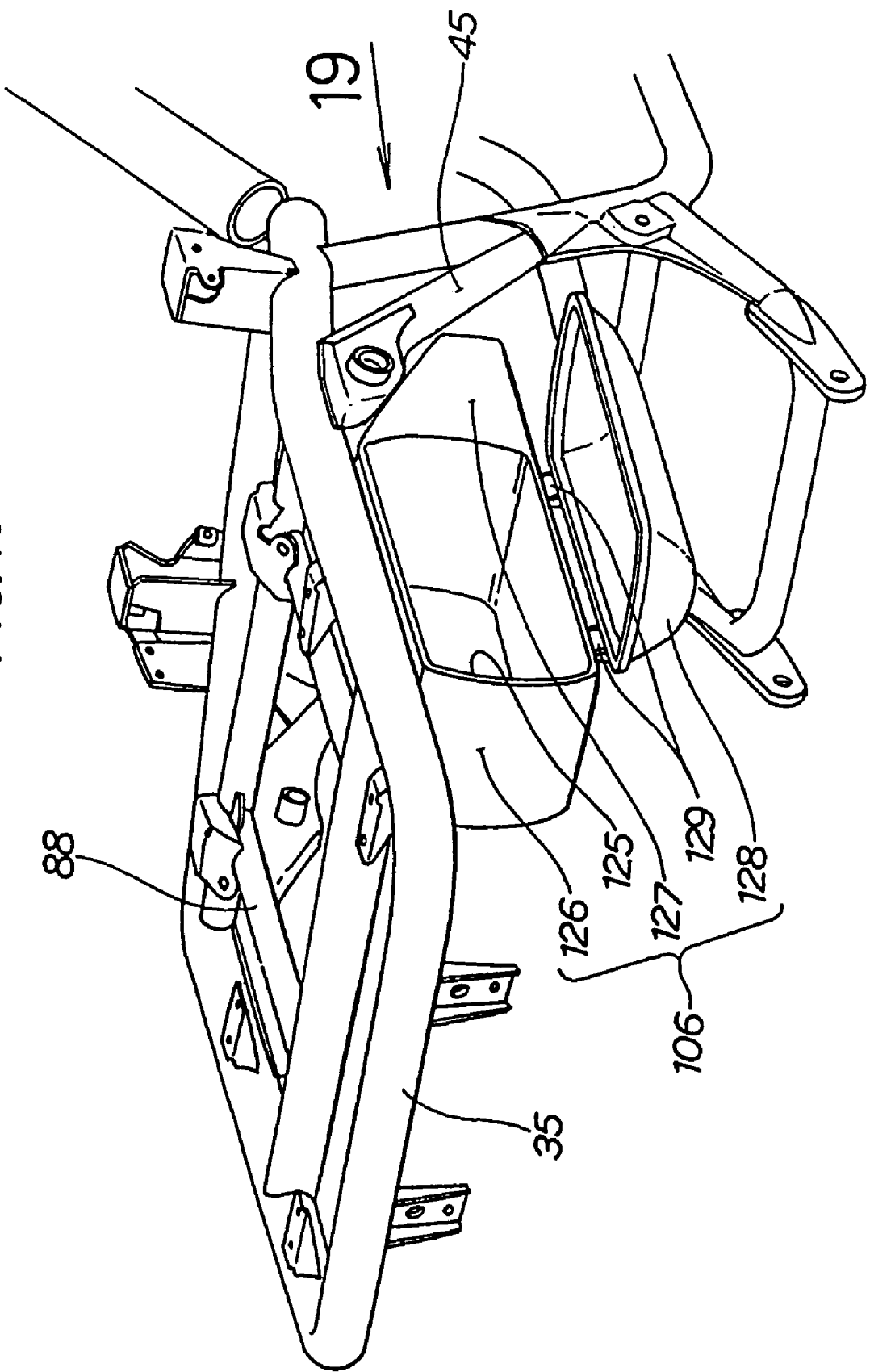
FIG. 18 is a perspective view of the dough box according to the present invention.

FIG. 18 is a perspective view of the dough box according to the present invention. The dough box 106 includes a container 126 provided with the lateral opening 125, a flange 127 overhung from the edge of the opening 125 of the dough container 126 toward the front of the vehicle body, a lid 128 for closing the opening 125 of the dough container 126, and hinges 129, 129 for connecting the lid 128 to the lower edge of the opening 125.

The dough box 106 is mounted to the vehicle body by mounting the container 126 to the rear frame 35.

Figure 19:
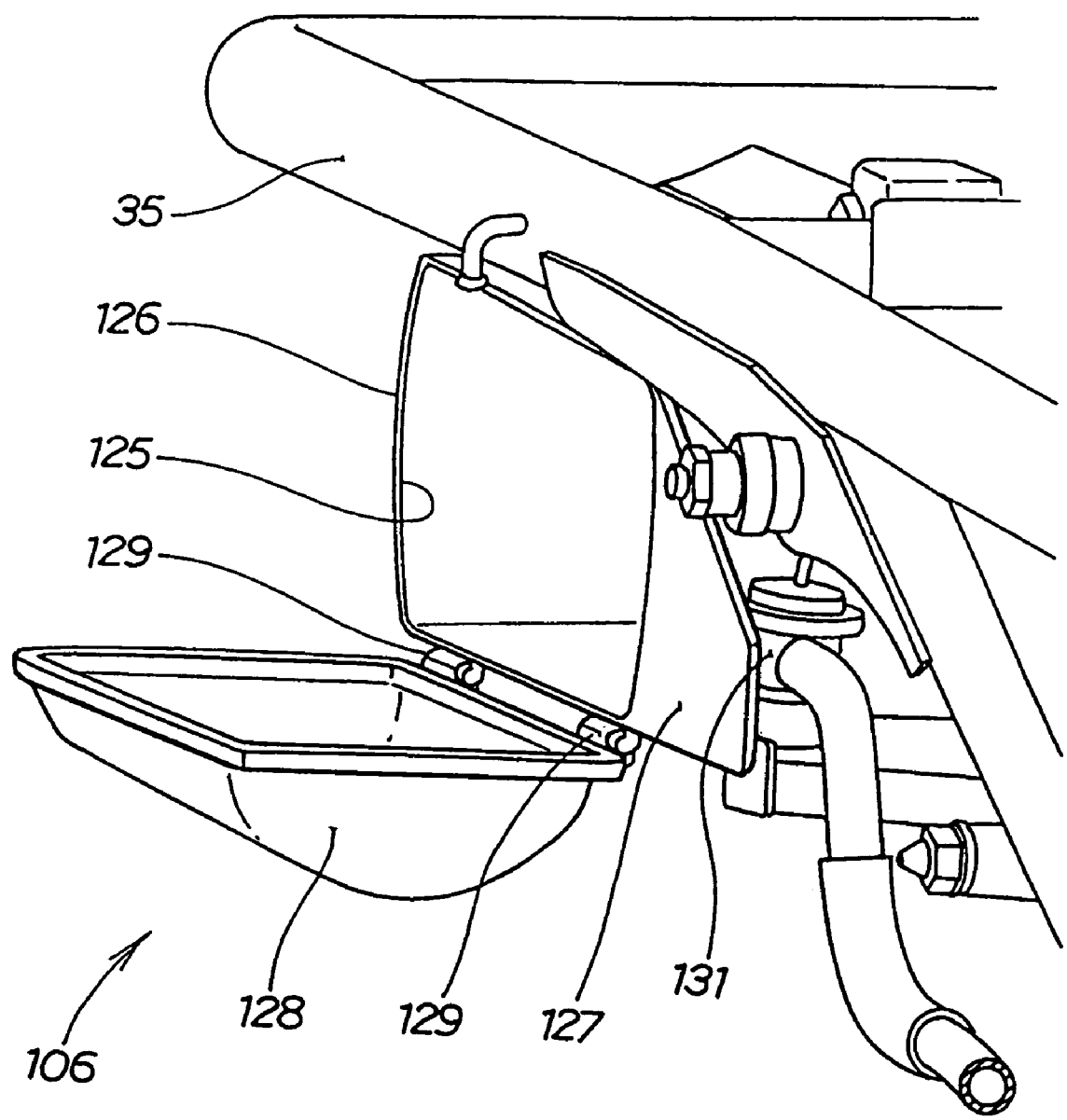
FIG. 19 is a drawing viewed in the direction indicated by an arrow 19 in FIG. 18.

FIG. 19 is a drawing viewed in the direction indicated by an arrow 19 in FIG. 18, in which a secondary air control valve 131 is disposed behind the flange 127 of the dough box 106. The secondary air control valve 131 is an important device for promoting burning of exhaust gas and burning unburned combustible gas component remaining in exhaust gas to clean exhaust gas by supplying adequate amount of air to an exhaust system of an engine.

The secondary air control valve 131 that is important as such is generally stored in the vehicle body cover in the scooter-type vehicle.

In the present embodiment, the secondary air control valve 131 is not stored in the vehicle body cover such as the side cover.

In this case, it is necessary to cover a specific protective cover on the secondary air control valve 131 in order to protect it from a stone scattering from the outside. In this case, the specific protective cover, a mounting bracket and screws are required and the number of components increases.

According to the present invention, the flange 127 is overhung from the dough box 106 disposed in the vicinity, so that the secondary air control valve 131 is protected by the flange 127. Accordingly, it is not necessary to additionally provide the specific protective cover, the mounting bracket, and the screws, and hence the number of the components can be reduced. In addition, since the secondary air control valve 131 is disposed outside the vehicle body cover, maintenance and replacement of the secondary air control valve 131 can be carried out only by dismounting the dough box 106.

Subsequently, the protective cover for the air intake port of the air cleaner will be described.

Figure 20A:
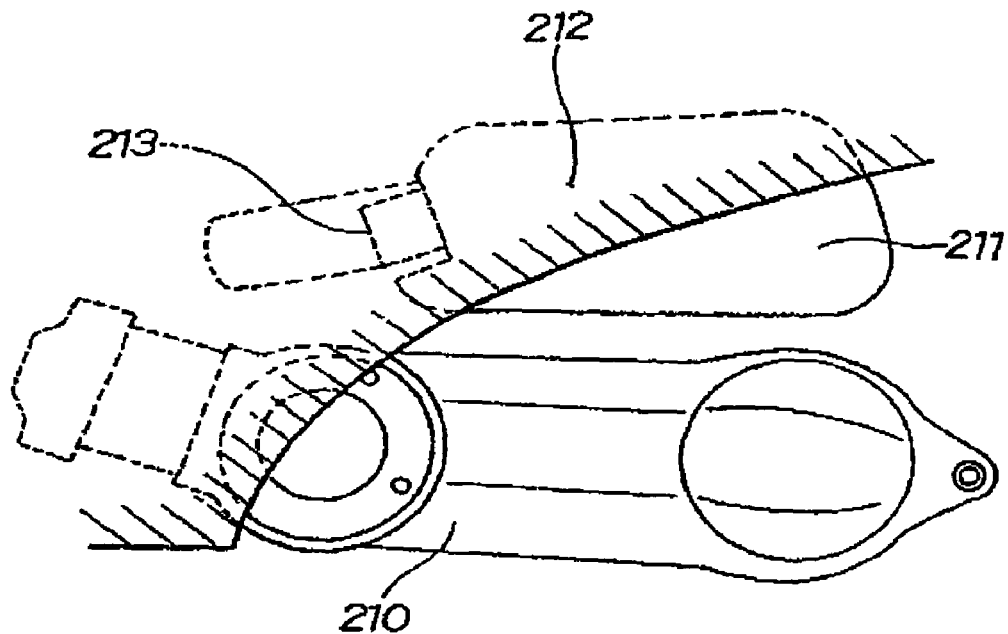
FIGS. 20A–B are side views showing an air cleaner and a power unit of the prior art and according to the invention, respectively.
Figure 20B:
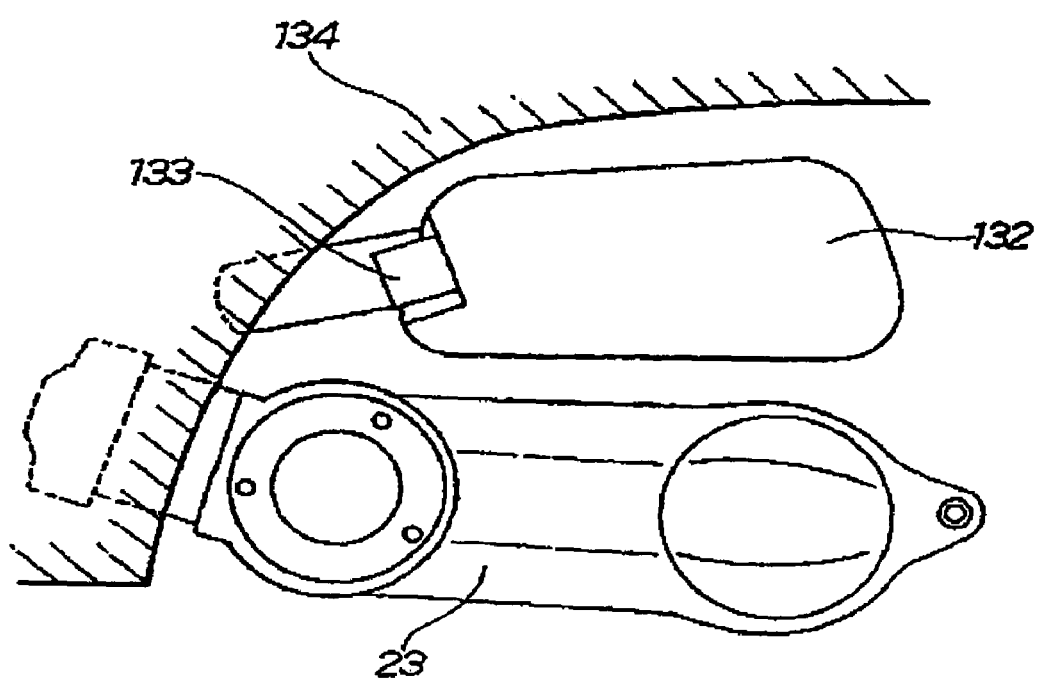

FIG. 20(a), (b) are side views showing the air cleaner and the power unit, in which the drawing (a) is a comparative example, and (b) is an embodiment.

In the comparative example shown in the drawing (a), an air cleaner 211 is disposed upwardly of a power unit 210, and an air intake port 213 of the air cleaner 211 is covered with the vehicle body cover 212. Such a structure is mainly employed in normal scooter-type vehicles.

In the embodiment in the drawing (b), it is shown that an air cleaner 132 is disposed above the power unit 23, and an air intake port 133 of the air cleaner 132 is not covered with a vehicle body cover 134. Although the vehicle body cover 134 can be downsized, foreign substances such as a scattering stone, sand, mud and the like scattering from the near side of the drawing are liable to enter into the air intake port 133, and hence the countermeasure has to be taken. When attempt is made to provide an air intake port cover as a countermeasure, a cover supporting bracket for covering the air intake port is necessary. However, since provision of the cover supporting bracket results in increase in the number of components, it is not preferable.

Figure 21:
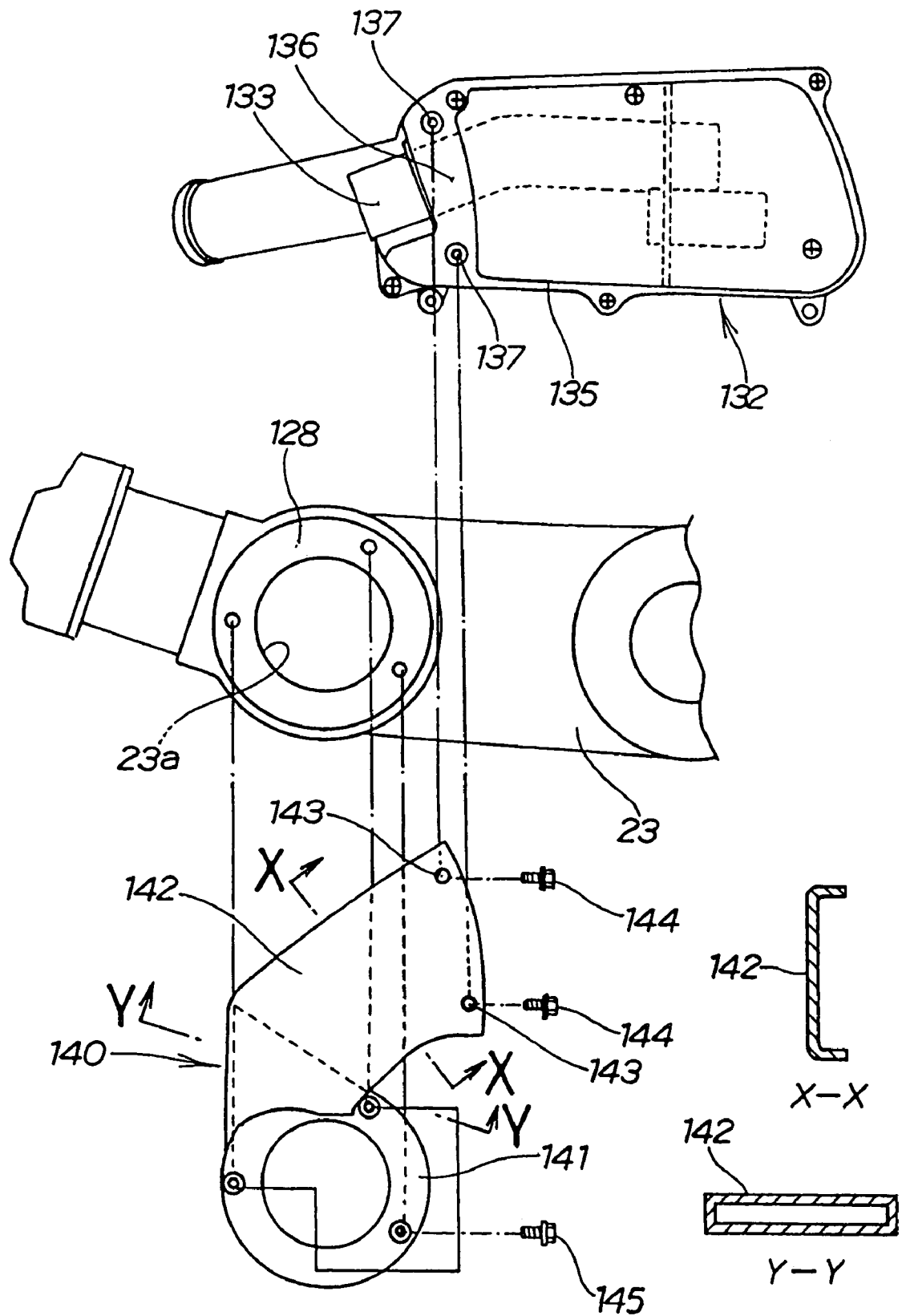
FIG. 21 shows a procedure of mounting an air intake port cover according to the present invention.

FIG. 21 shows a procedure for mounting the air intake port cover according to the present invention. The present inventors made an attempt to utilize the lid 128 of the power unit 23 which is located in the vicinity of the air intake port 133.

That is, a recess 136 is formed on the case 135 of the air cleaner 132 so as to set back toward the far side of the plane of the drawing, and the screw holes 137, 137 are provided in the recess 136.

The air intake port cover 140 is configured of a disk portion 141 having substantially the same shape as the lid 128, a cover unit 142 overhung from the disk portion 141, and bolt holes 143, 143 provided on the extremity of the cover unit 142.

Reference sign X—X shown in the lower right of the drawing is a cross section of the cover unit 142 taken along the line X—X, and reference sign Y—Y is a cross section of the cover unit 142 taken along the line Y—Y, showing that the base portion of the cover unit 142 forms a duct. Through this duct, cooling air can be introduced to a cooling-air suction port 23a of the power unit 23.

The air intake cover 140 is fixed by overlapping the bolt holes 143, 143 over the screw holes 137, 137 and securing them with bolts 144, 144, and then securing the disk portion 141 together with the lid 128 with bolts 145, 145 which are securing the lid 128.

Figure 22:
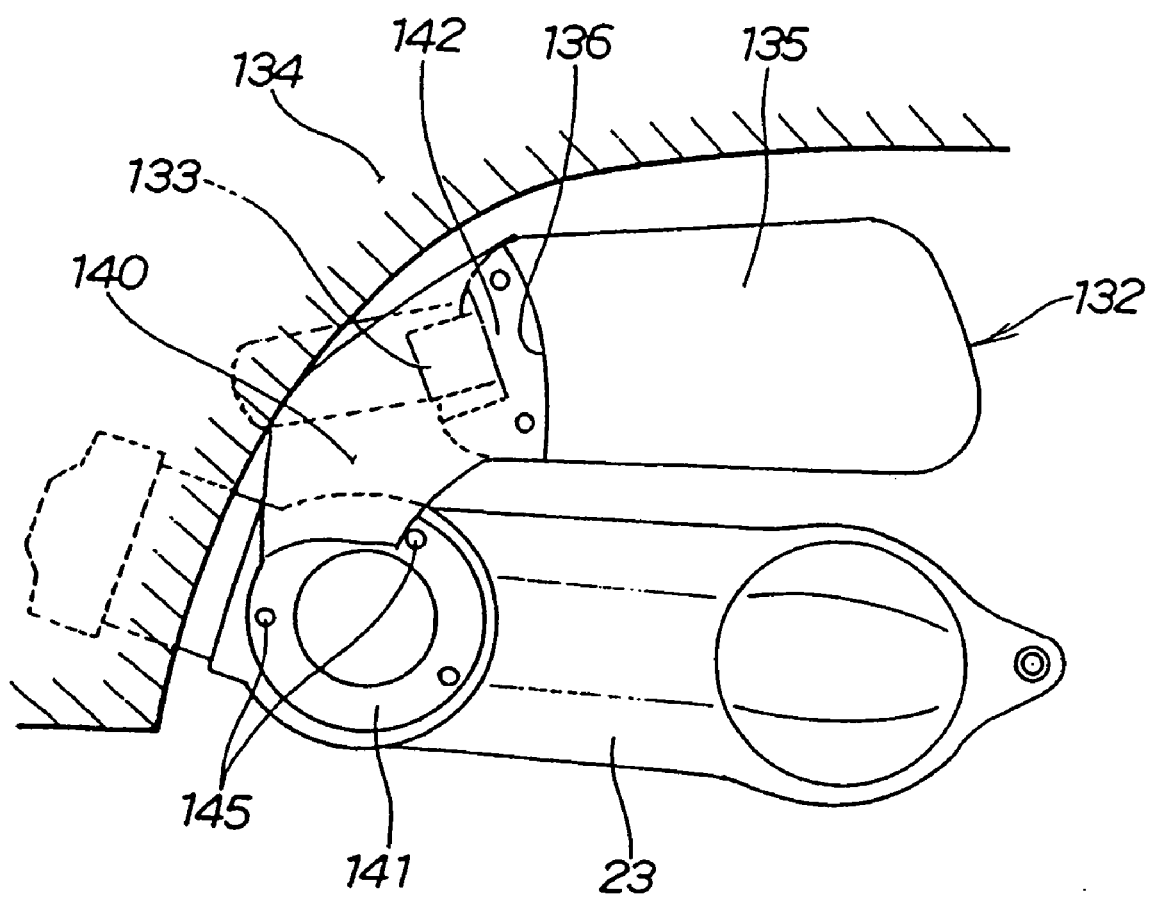
FIG. 22 shows a state in which the air intake port cover of the present invention is mounted.

FIG. 22 is a drawing showing a state of mounting the air intake port cover according to the present invention, showing that the air intake port cover 140 is mounted by being bridged over the power unit 23 and the air cleaner 132 without using the specific bracket.

In addition, the cover unit 142 of the air intake port cover 140 is fitted to the recess 136, so that the cover unit 142 is aligned in flush with the case 135 of the air cleaner 132, thereby providing a preferable appearance.

The air intake port cover 140 provided so as to cover the cooling-air suction port 23a of the power unit 23 is used also to cover the air intake port 133 of the air cleaner 132. As a consequence, even when the air intake port 133 of the air cleaner is disposed at the position out of the protection of the vehicle body cover, entering of foreign substances and leakage of suction sound can be prevented simultaneously.

In addition, the air intake port cover 140 does not require a stay for supporting the cover since it is secured to the power unit 23, and hence reduction of the number of the components is achieved.

In addition, the air intake port cover 140 serves as a bridge extending between the power unit 23 and the air cleaner 132, and serves as a decorative member, the appearance of the scooter-type vehicle on the side of the rear portion thereof may be improved.

The invention is characterized in that the air intake port cover 140 is secured also to the air cleaner case 135.

The air cleaner case 135 and the power unit 23 are connected via the air intake port cover 140. Therefore, the entire rigidity may be improved.

Figure 23:
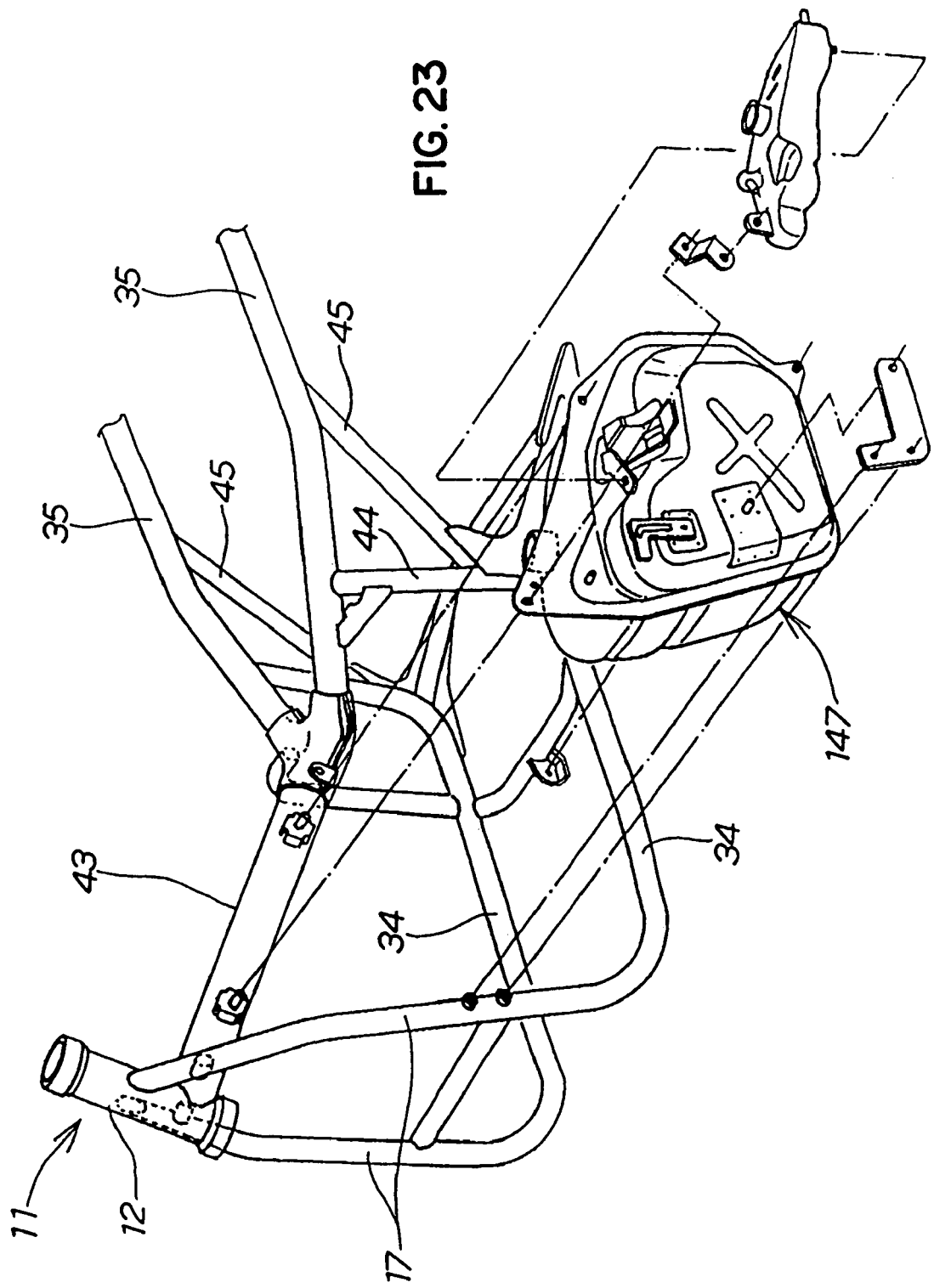
FIG. 23 is a perspective view of the vehicle body frame according to the present invention.
Figure 24:
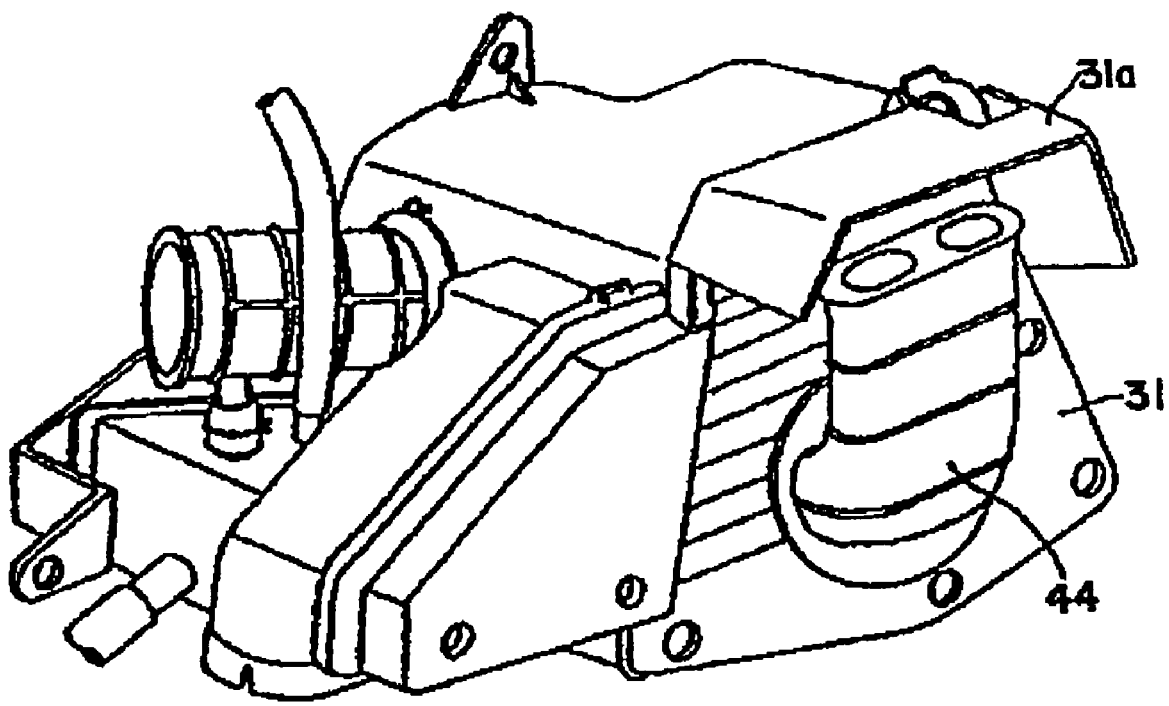
FIG. 24 is a cited drawing from FIG. 1 according to Patent Document 1.

FIG. 23 is a perspective view of the vehicle body frame according to the present invention, in which the main frame 43 is extended from the head pipe 12 and two of the rear frames 35, 35, which are normally referred to as seat rails are extended from the main frame 43. Reference numeral 147 designates a fuel tank to be mounted to the vehicle body frame 11.

The separate frame according to the present invention is not specifically limited to the shape of the separate frame, and is arbitrary as long as it can be mounted to the existing main frame or the combination of the main frame and the rear frame with bolts or the like later. The vehicle components to be mounted to the separate frame can be freely selected.

Although the embodiment of the present invention has been described thus far, the present invention is not limited to the example in the drawings described above, and various modification may be made without departing the scope of the present invention, as a matter of course.

We claim:

1. A scooter-type vehicle having a vehicle body frame, the vehicle comprising:
   a power unit of a type that takes in cooling air through a cooling-air suction port for controlling increase in internal temperature, the power unit being mounted to the vehicle body frame so as to be capable of swinging in the vertical direction; and
   an air cleaner disposed above the power unit and in the vicinity of the cooling-air suction port, the air cleaner supplying air to a combustion chamber of the power unit, the air cleaner including an air cleaner case having an air intake port through which air enters the air cleaner case, the air intake port of the air cleaner is disposed in the vicinity of the cooling-air suction port, and the air intake port of the air cleaner case is covered with an air intake port cover mounted to the cooling-air suction port, and the air intake port cover is secured to the air cleaner case.

2. A scooter-type vehicle according to claim 1, wherein the air cleaner case is not covered with a vehicle body cover.

3. A scooter-type vehicle according to claim 1, further comprising:
   a dough box mounted to the vehicle body frame, the dough box including a flange extending therefrom;
   a vehicle body cover;
   a secondary air control valve for supplying air to an exhaust system of an engine wherein the secondary air control valve is not stored in the vehicle body cover and is protected from debris scattering from the outside by the flange.

* * * * *